(12) United States Patent
Lin et al.

(10) Patent No.: US 11,384,471 B2
(45) Date of Patent: Jul. 12, 2022

(54) BRAKE FOR DRUM WASHING MACHINE AND DRUM WASHING MACHINE

(71) Applicant: WUXI LITTLE SWAN ELECTRIC CO., LTD., Wuxi (CN)

(72) Inventors: Guangfang Lin, Wuxi (CN); Song Lu, Wuxi (CN); Xiangkuan Liu, Wuxi (CN); Chaolin Gu, Wuxi (CN)

(*) Notice: Subject to any disclaimer, the term of this patent is extended or adjusted under 35 U.S.C. 154(b) by 26 days.

(21) Appl. No.: 16/970,381

(22) PCT Filed: Aug. 1, 2018

(86) PCT No.: PCT/CN2018/097883
§ 371 (c)(1),
(2) Date: Aug. 17, 2020

(87) PCT Pub. No.: WO2019/227656
PCT Pub. Date: Dec. 5, 2019

(65) Prior Publication Data
US 2020/0407907 A1    Dec. 31, 2020

(30) Foreign Application Priority Data

May 29, 2018  (CN) .......................... 201810532196.7
May 29, 2018  (CN) .......................... 201820826248.7

(51) Int. Cl.
*D06F 23/02* (2006.01)
*D06F 37/04* (2006.01)
(Continued)

(52) U.S. Cl.
CPC .............. *D06F 37/40* (2013.01); *D06F 23/02* (2013.01); *D06F 23/025* (2013.01); *D06F 37/04* (2013.01);
(Continued)

(58) Field of Classification Search
None
See application file for complete search history.

(56) References Cited

U.S. PATENT DOCUMENTS

| | | | |
|---|---|---|---|
| 4,255,952 | A | 3/1981 | Johnson |
| 4,317,343 | A | 3/1982 | Gerry |

(Continued)

FOREIGN PATENT DOCUMENTS

| | | |
|---|---|---|
| CN | 1055968 A | 11/1991 |
| CN | 2787706 Y | 6/2006 |

(Continued)

OTHER PUBLICATIONS

International Search Report of PCT/CN2018/097883.
Search Report for EP application 18920537.0.
OA for JP application 2020-541399.

*Primary Examiner* — Levon J Shahinian
(74) *Attorney, Agent, or Firm* — Kilpatrick Townsend & Stockton, LLP

(57) ABSTRACT

A brake for a drum washing machine and a drum washing machine are disclosed. The brake includes a brake disk, provided on a second shaft; a brake seat, provided with a slideway; a brake pawl, provided to the brake seat, switchable between a state of holding the brake disk and a state of releasing the brake disk; a brake lever, slidably fitted with the slideway between an extending position and a retracting position, and the brake pawl is switched to the tightening state when the brake lever is at the extending position, and the brake pawl is switched to the releasing state when the brake lever is at the retracting position; a brake driver, mounted to the brake seat and in transmission connection with the brake lever, the brake driver driving the brake lever to move between the extending position and the retracting position.

18 Claims, 21 Drawing Sheets

(51) Int. Cl.
  *D06F 37/30* (2020.01)
  *D06F 37/36* (2006.01)
  *D06F 37/40* (2006.01)
  *F16H 3/44* (2006.01)
  *F16H 57/10* (2006.01)

(52) U.S. Cl.
  CPC .............. *D06F 37/30* (2013.01); *D06F 37/36* (2013.01); *F16H 3/44* (2013.01); *F16H 57/10* (2013.01); *F16H 2200/2005* (2013.01); *F16H 2200/2033* (2013.01)

(56) References Cited

U.S. PATENT DOCUMENTS

| | | | |
|---|---|---|---|
| 6,336,541 B1 | 1/2002 | Spa | |
| 2019/0017211 A1* | 1/2019 | Kim | ........................ D06F 37/40 |

FOREIGN PATENT DOCUMENTS

| | | | |
|---|---|---|---|
| CN | 102206914 | A | 10/2011 |
| CN | 203668702 | U | 6/2014 |
| CN | 204803604 | U | 11/2015 |
| CN | 105887418 | A | 8/2016 |
| CN | 105908448 | A | 8/2016 |
| CN | 107059339 | A | 8/2017 |
| JP | H06126088 | A | 5/1994 |
| JP | 2016054945 | A | 4/2016 |
| KR | 20100034922 | A | 4/2010 |

* cited by examiner

BRAKE FOR DRUM WASHING MACHINE AND DRUM WASHING MACHINE

CROSS-REFERENCES TO RELATED APPLICATIONS

The present disclosure is a national phase application of International Application No. PCT/CN2018/097883, filed on Aug. 1, 2018, which claims priority to Chinese Patent Applications Serial No. 201810532196.7 and No. 201820826248.7, filed in the Chinese Patent Office on May 29, 2018, the entireties of which are herein incorporated by reference.

FIELD

The present disclosure relates to the field of laundry treating devices, and more particularly to a brake for a drum washing machine and a drum washing machine.

BACKGROUND

When laundry is washed in a drum washing machine, a drum is rotated to drive the laundry and water in the drum to rotate and wash the laundry, and the laundry is lifted up and down by a baffle in the drum and is dropped by an inner circumferential surface of the drum. However, due to a single washing mode, the washing effect is affected. Therefore, there is a need for improvements.

To this end, a drum washing machine provided with an impeller in a drum is proposed in a related art. For example, PCT/CN2016/11037 discloses a drum-type washing machine, in which the impeller is directly driven to rotate by an electric motor while the electric motor drives the drum to rotate by means of transmission of a planetary gear mechanism, and a rotational speed of the drum is less than a rotational speed of the impeller.

However, since the drum itself has a larger volume than the impeller does, and the drum is required to carry the laundry and the water during washing, the planetary gear mechanism has a relatively large load, affecting the effect of transmission of power by the planetary gear mechanism and the service life thereof. Furthermore, the drum-type washing machine implements switching of a drive form of a drive portion by a clutch mechanism portion, and the structure of the clutch mechanism portion is complicated and difficult to control.

SUMMARY

The present application seeks to solve at least one of the problems existing in the related art to at least some extent. To this end, the present disclosure proposes a brake for a drum washing machine, switching a mode of an agitator collaborative with a drum, with the advantages of a simple structure, convenient control, stabilization, or the like.

The present disclosure also proposes a drum washing machine having the above-mentioned brake.

A brake for a drum washing machine according to embodiments of the present disclosure includes: a brake disk provided on a second shaft of the drum washing machine connected to a planetary gear assembly; a brake seat provided with a slideway; a brake pawl provided to the brake seat and switchable between a tightening state of holding the brake disk and a releasing state of releasing the brake disk; a brake lever slidably fitted with the slideway between an extending position and a retracting position and linked with the brake pawl, and the brake pawl is switched to the tightening state when the brake lever is located at the extending position, and the brake pawl is switched to the releasing state when the brake lever is located at the retracting position; and a brake driver mounted to the brake seat, in transmission connection with the brake lever, and driving the brake lever to move between the extending position and the retracting position.

In the brake for a drum washing machine according to the embodiment of the present disclosure, the brake driver drives the brake lever to move between the extending position and the retracting position, and the brake lever is linked with the brake pawl, the brake disk on the second shaft of the drum washing machine is held or released using the brake pawl, the second shaft is switched between a free state and a braking state, and then a torque of a main shaft is transmitted to the agitator through the planetary gear assembly to drive the agitator to rotate. Thus, the rotation of the agitator may be combined with the rotation of the drum into various washing modes to diversify the washing mode of the drum washing machine.

Moreover, the brake has a small number of parts and a simpler structure. The brake driver drives the brake lever to move between the extending position and the retracting position, and the brake lever is linked with the brake pawl to hold or release the brake disk, and the planetary gear assembly is switched between a first state and a second state. Therefore, compared with the drum washing machine with an impeller in the related art, the brake pawl directly acts on the brake disk on the second shaft, which facilitates control. Due to a small number of transmission structures, power transmission is more direct, an operating state of the second shaft may be stably switched, which facilitates stable transmission of power to improve the performance stability of the drum washing machine.

Therefore, the brake for a drum washing machine according to the embodiment of the present disclosure switching a mode of an agitator collaborative with a drum and has the advantages of a simple structure, convenient control, stabilization, or the like.

According to some specific embodiments of the present disclosure, an outer peripheral surface of the brake disk is provided with gear teeth, and an inner side surface of the brake pawl is provided with pawl teeth, when the brake pawl is in the tightening state, the pawl teeth mesh with the gear teeth, and when the brake pawl is in the releasing state, the pawl teeth are disengaged from the gear teeth.

According to some specific examples of the present disclosure, the brake pawl includes: a first pawl portion having a first end pivotally mounted to the brake seat; a second pawl portion having a first end pivotally mounted to the brake seat, the brake disk being located between the first pawl portion and the second pawl portion, when the brake pawl is in the tightening state, a second end of the first pawl portion and a second end of the second pawl portion are adjacent to each other, and when the brake pawl is in the releasing state, the second end of the first pawl portion and the second end of the second pawl portion are away from each other.

Furthermore, at least a part of the first pawl portion is configured to be in a shape of an arc matching a shape of the brake disk, and at least a part of the second pawl portion is configured to be in a shape of an arc matching a shape of the brake disk.

Furthermore, the brake seat is provided with a first rotation column and a second rotation column in the brake seat, the first pawl portion is provided with a first pivot hole pivotally fitted over the first rotation column, the second pawl portion is provided with a second pivot hole pivotally fitted over the second rotation column.

Furthermore, the brake lever is provided with a first drive chute and a second drive chute obliquely respect to a sliding direction of the brake lever separately, the second end of the first pawl portion is provided with a first drive column slidably fitted with the first drive chute, and the second end of the second pawl portion is provided with a second drive column slidably fitted with the second drive chute.

Furthermore, an end of the first drive chute away from the brake disk and an end of the second drive chute away from the brake disk are adjacent to each other, and an end of the first drive chute adjacent to the brake disk and an end of the second drive chute adjacent to the brake disk are away from each other.

Furthermore, the brake lever is provided with a first limiting groove and a second limiting groove separately parallel to a sliding direction of the braking lever respectively, the first limiting groove is in communication with the first drive chute and extends from the first drive chute in a direction away from the brake disk, the second limiting groove is in communication with the second drive chute and extends from the second drive chute in a direction away from the brake disk, the first drive column slides into the first limiting groove and the second drive column slides into the second limiting groove when the brake pawl is in the tightening state.

According to some specific examples of the present disclosure, the brake seat is provided with a first guide chute and a second guide chute obliquely respect to a sliding direction of the brake lever separately, a first guide column slidably fitted with the first guide chute is provided between two ends of the first pawl portion, and a second guide column slidably fitted with the second guide chute is provided between two ends of the second pawl portion.

Furthermore, an end portion of the first guide column is provided with a first anti-off head configured to prevent the first guide column from escaping from the first guide chute, and an end portion of the second guide column is provided with a second anti-off head configured to prevent the second guide column from escaping from the second guide chute.

According to some specific embodiments of the present disclosure, the brake lever includes: a shifter lever linked with the brake pawl; a transmission bar in transmission connection with the brake driver and hooked to the shifter lever; and a brake compression spring compressed between the shifter lever and the transmission bar.

Furthermore, the shifter lever is provided with a hooking surface facing the brake disk, the transmission bar is provided with a hook, and the hook is hooked to the hooking surface.

Furthermore, the shifter lever is provided with a mounting cavity and the mounting cavity is provided with a stop step therein, the transmission bar is provided with a slide block having a section in a shape matching a shape of a cross section of the slideway, the brake compression spring is fitted over the transmission bar, the brake compression spring and the transmission bar extend into the mounting cavity, the brake compression spring has a first end abutting against the stop step and a second end abutting against the slide block.

Furthermore, the brake seat includes a main housing and a support detachably mounted to the main housing, the brake pawl is mounted to the main housing and the brake driver is mounted to the support, the slideway includes a housing section and a support section spaced apart from each other, the housing section is formed at the main housing and the support section is formed at the support, the shifter lever is slidably fitted with the housing section, and the transmission bar is slidably fitted with the support section.

According to some specific embodiments of the present disclosure, the brake further includes: a brake cam, the brake driver is configured as an electric motor and in transmission connection with the brake lever via the brake cam, the brake cam converting a rotational motion of an electric motor shaft of the electric motor into a linear motion of the brake lever in the slideway.

Furthermore, the cam is provided with an eccentric column, and the brake lever is provided with a straight sliding groove, and the eccentric column is slidably fitted in the straight sliding groove.

Furthermore, a length direction of the straight sliding groove is perpendicular to a direction of the linear motion of the brake lever.

According to some specific embodiments of the present disclosure, the brake seat is configured to be mounted to a rear wall of a tub of the drum washing machine.

A drum washing machine according to embodiments of the present disclosure includes the brake for a drum washing machine according to the above-mentioned embodiments.

Additional embodiments of the present disclosure will be given in part in the following descriptions, become apparent in part from the following descriptions, or be learned from the practice of the embodiments of the present disclosure.

BRIEF DESCRIPTION OF THE DRAWINGS

Embodiments of the present disclosure will become apparent and more readily appreciated from the following descriptions made with reference to the drawings, in which:

FIG. 3 is an exploded view before the drum support is assembled with a main shaft, a second shaft, a planetary gear assembly of the drum washing machine, or the like;

Figure 1:
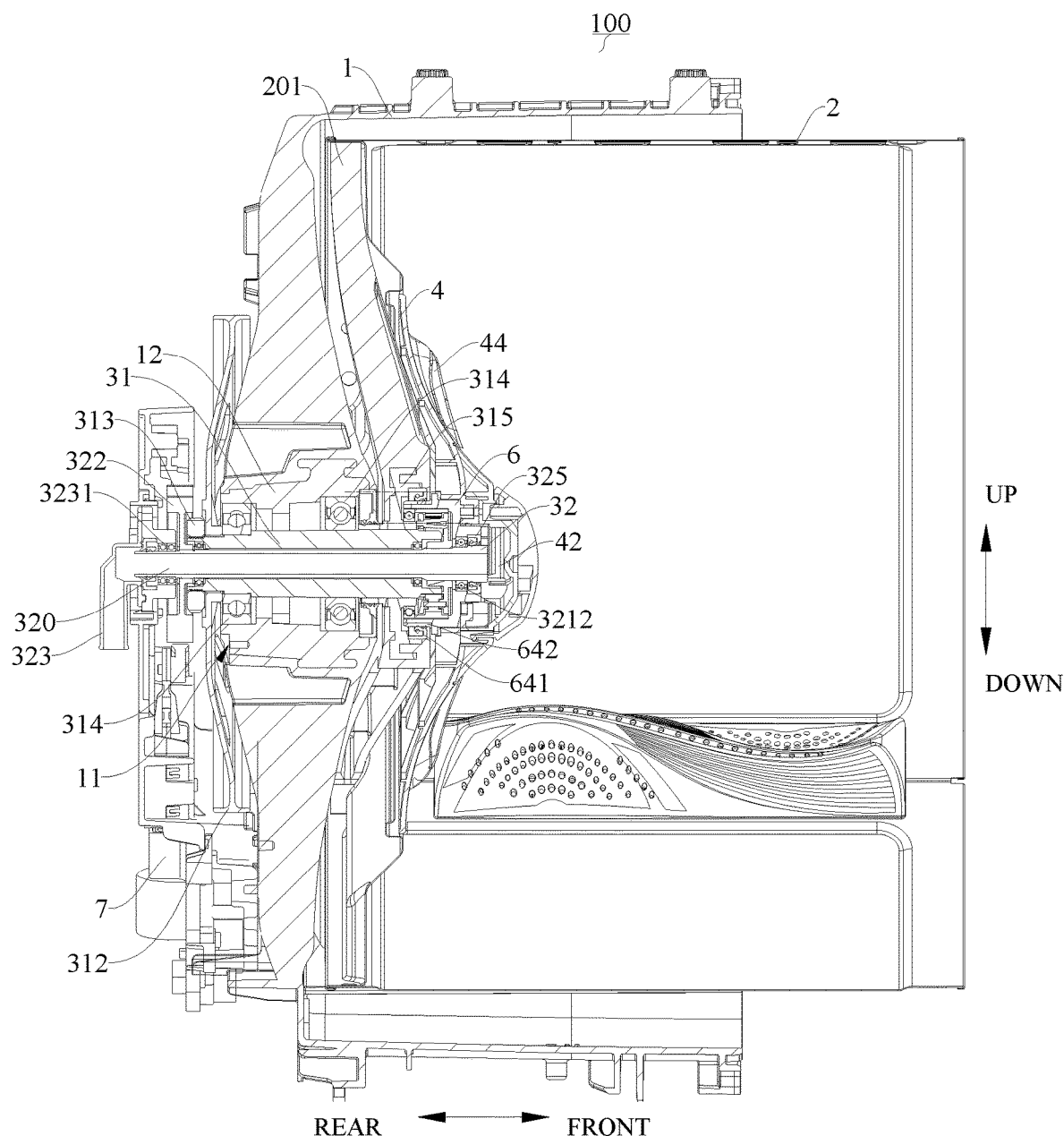
FIG. 1 is a schematic structural diagram of a drum washing machine according to an embodiment of the present disclosure.

REFERENCE NUMERALS drum washing machine 100,
tub 1, mounting hole 11, main shaft bearing seat 12,
drum 2, drum support 201, central shaft portion 2011, support portion 2012, drum body 21, rear cover 22 of the drum,
main shaft 31, cavity 311, pulley 312, belt 3121, lock nut 313, main shaft bearing 314, main shaft flange 315, main shaft sleeve 316,
second shaft 32, water supply passage 320, second shaft bearing 3211, second shaft end bearing 3212, brake disk 322, gear teeth 3221
adapter 323, adapter bearing 3231, shaft seal 325, anti-rotation protrusion 3232, axial jaw 3233, shield cover 3234, adapter seat 3235, adapter cover 3236, adapter seal ring 3237,
agitator 4, water spray hole 41, water collection cavity 42, water dividing passage 43, rib 44,
electric motor 5, electric motor shaft 51,
planetary gear assembly 6,
planetary gear component 61, planet carrier 611, planetary gear support 6111, mounting boss 6112, positioning column 6113, planetary gear mounting seat 6114, planetary gear fixing shaft 6115, planetary gear fixing disk 6116, positioning hole 6117, limiting hole 6118, planetary gear 612, planetary gear outer teeth casing 613, flange 6131,
planetary gear casing 62, latching slot 621, through hole 622,
planetary gear bearing 63, assembly seal 641, wear sleeve 642,
brake 7,
brake seat 71, slideway 711, housing section 7111, support section 7112, first rotation column 712, second rotation column 713, main housing 714, support 715, avoidance hole 716, anti-rotation groove 7161, axial hook 7162, brake lever 72, first drive chute 721, second drive chute 722, first limiting groove 723, second limiting groove 724, first guide chute 725, second guide chute 726, shifter lever 727, hooking surface 7271, mounting cavity 7272, stop step 7273, transmission bar 728, hook 7281, slide block 7282, brake compression spring 729, straight sliding groove 720, brake driver 73, brake cam 74, eccentric column 741,
brake pawl 75, pawl teeth 751, first pawl portion 752, first pivot hole 7521, first drive column 7522, first guide column 7523, first anti-off head 7524, second pawl portion 753, second pivot hole 7531, second drive column 7532, second guide column 7533, second anti-off head 7534,
brake base 76, brake coverplate 77, main base 761, coverplate section 762

DETAILED DESCRIPTION OF THE DISCLOSURE

Reference will be made in detail to embodiments of the present application, and the examples of the embodiments are illustrated in the drawings, and the same or similar elements and the elements having same or similar functions are denoted by like reference numerals throughout the descriptions. The embodiments described herein with reference to drawings are illustrative, and merely used to explain the present application. The embodiments shall not be construed to limit the present application.

In the description of the present application, it is to be understood that terms such as "center", "length", "width", "thickness", "upper", "lower", "front", "rear", "left", "right", "vertical", "horizontal", "top", "bottom", "inner", "outer", "clockwise", "anticlockwise", "axial", "radial", and "circumferential" should be construed to refer to the orientation as then described or as shown in the drawings under discussion. These relative terms are for convenience of description and do not require that the present application be constructed or operated in a particular orientation, thus cannot be construed to limit the present application. Furthermore, the feature defined with "first" and "second" may include one or more of this feature explicitly or implicitly. In the description of the present disclosure, the term "a plurality of" means two or more unless otherwise stated.

In the description of the present disclosure, it should be noted that unless specified or limited otherwise, the terms "mounted", "connected", and "coupled" and the like are used broadly, and may be, for example, fixed connections, detachable connections, or integral connections; may also be mechanical or electrical connections; may also be direct connections or indirect connections via intervening structures; may also be inner communications of two elements.

A drum washing machine 100 according to an embodiment of the present disclosure will be described below with reference to FIGS. 1 to 23.

As shown in FIGS. 1 to 23, the drum washing machine 100 according to an embodiment of the present disclosure includes a tub 1, a drum 2, an agitator 4, a driver (such as an electric motor 5 described below), and a planetary gear assembly 6.

The drum 2 is rotatably provided in the tub 1. The agitator 4 is rotatably provided in the drum 2. The driver is in transmission connection with the drum 2 via a main shaft 31 which transmits a torque of the driver to the drum 2. The planetary gear assembly 6 is in transmission connection with the main shaft 31 and the agitator 4 separately. When the driver drives the main shaft 31 to rotate, the planetary gear assembly 6 may transmit the torque of the main shaft 31 to the agitator 4, driving the agitator 4 to rotate.

In the drum washing machine 100 according to the embodiment of the present disclosure, by providing the driver and driving the main shaft 31 to rotate to drive the drum 2 to rotate using the driver, and further providing the agitator 4 in the drum 2, and transmitting the torque of the main shaft 31 to the agitator 4 using the planetary gear assembly 6 to drive the agitator 4 to rotate, the rotation of the agitator 4 may be combined with the rotation of the drum 2 into various washing modes, for example, only one of the agitator 4 and the drum 2 is rotated or the agitator 4 and the drum 2 are rotated at the same time, or in the same direction or in opposite directions, diversifying the washing mode of the drum washing machine 100.

Moreover, the driver drives the drum 2 via the main shaft 31, to directly drive a component with a relatively large load using the driver, the number of levels of power transmission is less, and the power transmission is more direct, stably driving the drum which is large in volume and required to accommodate laundry and water. The planetary gear assembly 6 is provided between the main shaft 31 and the agitator 4, and the torque of the main shaft 31 is transmitted to the agitator by the planetary gear assembly 6 to indirectly drive the agitator 4 using the driver. Since the load at the agitator 4 is much less than the load at the drum 2, compared with a drum washing machine with an impeller (agitator) in the related art, the load acting on the planetary gear assembly 6 is greatly reduced, which not only facilitates stable power transmission to improve the performance stability of the drum washing machine 100, but also greatly reduces the risk of damage to the planetary gear assembly 6 to prolong the service life of the drum washing machine 100.

Therefore, the drum washing machine 100 according to the embodiments of the present disclosure may implement various washing modes, and has the advantages of stable performance, long service life, or the like.

Some specific embodiments of the drum washing machine 100 according to the present disclosure will be described in detail below with reference to FIGS. 1 to 23.

The planetary gear assembly 6 of the drum washing machine 100 according to the embodiment of the present disclosure is switchable between a first state and a second state.

The planetary gear assembly 6 in the first state transmits the torque of the main shaft 31 to the agitator 4 in the same direction, rotating the agitator 4 and the drum 2 in the same direction. The planetary gear assembly 6 in the second state transmits the torque of the main shaft 31 to the agitator 4 in an opposite direction, rotating the agitator 4 and the drum 2 in opposite directions. For example, if the driver drives the main shaft 31 to rotate clockwise, the planetary gear assembly 6 in the first state transmits the torque of the main shaft 31 to the agitator 4 in the same direction, rotating the agitator 4 and the drum 2 clockwise. The planetary gear assembly 6 in the second state transmits the torque of the main shaft 31 to the agitator 4 in an opposite direction, rotating the agitator 4 counterclockwise.

For example, when the drum washing machine 100 is in a spin mode, the planetary gear assembly 6 is switchable to the first state, and the agitator 4 and the drum 2 are driven to rotate in the same direction by the mode of power transmission of the planetary gear assembly 6 in the first state, ensuring that the laundry will not be entangled or torn when spinning at a high speed.

When the drum washing machine 100 is in a wash mode, the planetary gear assembly 6 is switchable to the second state, and the agitator 4 and the drum 2 are driven to rotate in opposite directions by the mode of power transmission of the planetary gear assembly 6 in the second state, agitating the laundry and water thoroughly to improve the effect of cleaning the laundry.

In one embodiment, the combination of the state switching of the planetary gear assembly 6 and the current mode of the drum washing machine 100 is not limited to the above-mentioned embodiments, and the first and second states of the planetary gear assembly 6 may also be combined with any one of the spin and wash modes.

Thus, by providing the planetary gear assembly 6 which is switchable between the first and second states, the rotation direction of the agitator 4 is adjustable, and the agitator 4 and the drum 2 are rotated in the same direction and in opposite directions, cooperating with the drum 2 to form operating modes suitable for different operating conditions.

In some examples, when the agitator 4 and the drum 2 are rotated in opposite directions, the rotation speed of the agitator 4 is less than the rotation speed of the drum 2. That is, when the planetary gear assembly 6 is in the second state, the variable-speed transmission of power is implemented. Thus, when the laundry and the water are sufficiently agitated, the laundry are prevented from being entangled, and the stability and noise reduction of the whole machine are contributed.

In some examples, when the agitator 4 and the drum are rotated in the same direction, the rotational speed of the agitator 4 is equal to the rotational speed of the drum 2. That is, when the planetary gear assembly 6 is in the first state, the agitator 4 is rotated in synchronization with the drum 2 (at the same speed and in the same direction).

As shown in FIGS. 6-11, according to an embodiment of the present disclosure, the planetary gear component 6 includes a planetary gear component 61 and the planetary gear component 61 includes a planet carrier 611, a plurality of planetary gears 612, and a planetary gear outer teeth casing 613.

The plurality of planetary gears 612 are rotatably mounted to the planet carrier 611 respectively, and an outer peripheral wall of the main shaft 31 has meshing teeth, and the plurality of planetary gears 612 are meshed with the meshing teeth on the main shaft 31 respectively. The planetary gear outer teeth casing 613 is fitted over the plurality of planetary gears 612, and the planetary gear outer teeth casing 613 meshes with the plurality of planetary gears 612 respectively, and the planetary gear outer teeth casing 613 is in transmission connection with the agitator 4.

It is understood that the inner peripheral wall of planetary gear outer teeth casing 613 has meshing teeth that mesh with the plurality of planetary gears 612. Thus, the main shaft 31, the plurality of planetary gears 612, the planet carrier 611, the planetary gear outer teeth casing 613 constitute a planetary gear train, and the shaft section of the main shaft 31 meshing with the plurality of planetary gears 612 forms a sun gear of the planetary gear train.

When the planet carrier 611 is allowed to rotate freely, the planetary gear assembly 6 is in the first state, and the agitator 4 and the drum 2 are rotated in the same direction; when the planet carrier 611 is braked, the planetary gear assembly 6 is in the second state, the plurality of planetary gears 612 are rotated respectively, and the outer casing 613 of the planetary gear and the main shaft 31 are rotated in opposite directions, rotating the agitator 4 and the drum 2 in opposite directions. Thus, by switching the state of the planet carrier 611 of the planetary gear assembly 6, the operating mode of the agitator 4 is controllable and the drum washing machine 100 is switchable among various operating modes.

Thus, according to the drum washing machine 100 of the embodiment of the present disclosure, by providing planetary gear assembly 6 between the main shaft 31 and the agitator 4, and transmitting the torque of the main shaft 31 to the agitator 4 using the planetary gear assembly 6 to drive the agitator 4 to rotate, the rotation of the agitator 4 may be combined with the rotation of the drum 2 into various washing modes, for example, only one of the agitator 4 and the drum 2 is rotated or the agitator 4 and the drum 2 are rotated at the same time, or in the same direction or in opposite directions, diversifying the washing mode of the drum washing machine 100.

Moreover, the torque of the main shaft 31 is transmitted to the agitator by the planetary gear assembly 6, and the agitator 4 is driven by the driver indirectly. Since the load of the agitator 4 is much less than the load of the drum 2, compared with the drum washing machine with an impeller (agitator) in the related art, the load acting on the planetary gear assembly 6 is greatly reduced, which not only facilitates stable power transmission to improve the performance stability of the drum washing machine 100, but also greatly reduces the risk of damage to the planetary gear assembly 6 to prolong the service life of the drum washing machine 100.

Figure 8:
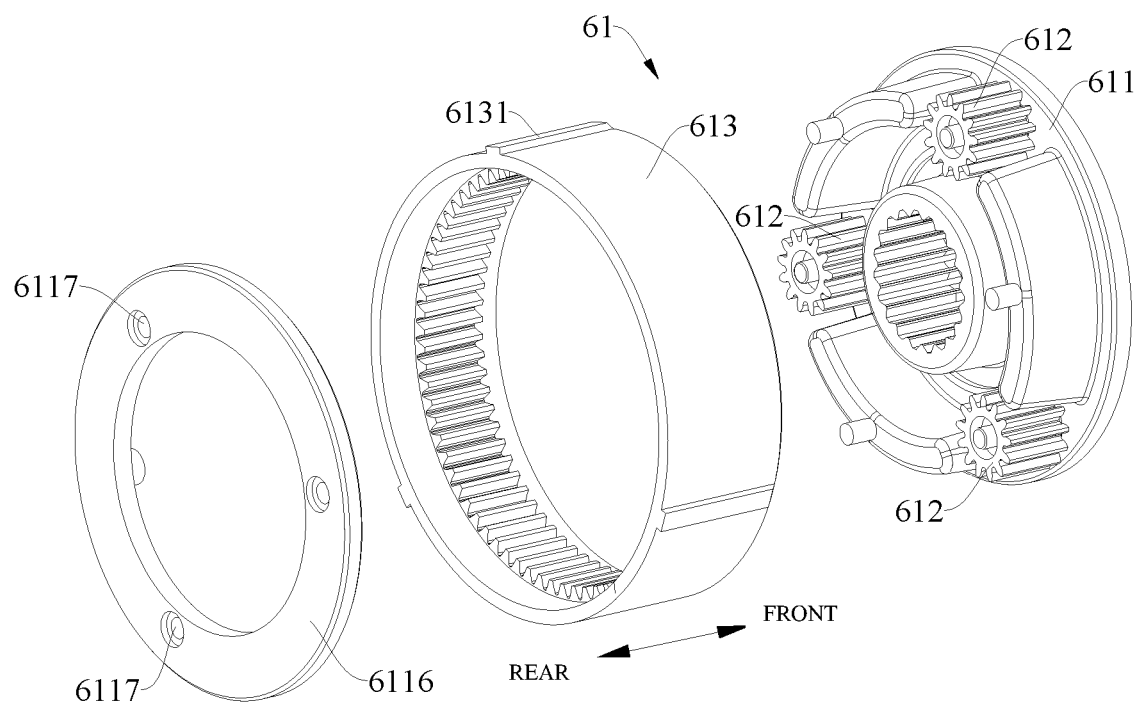
FIG. 8 is an exploded view of a planetary gear component of the drum washing machine.
Figure 9:
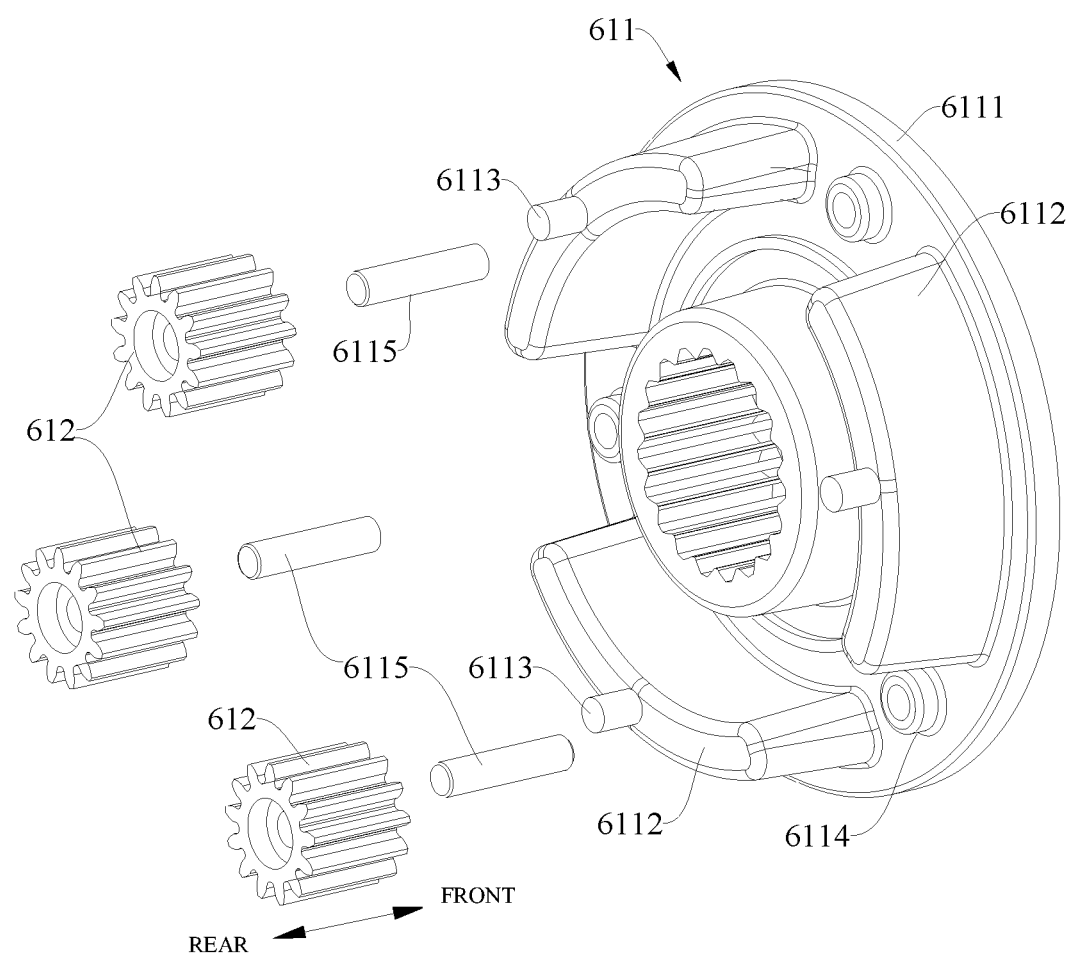
FIG. 9 is an exploded view before a planet carrier and a planetary gear shown in FIG. 8 are assembled.
Figure 10:
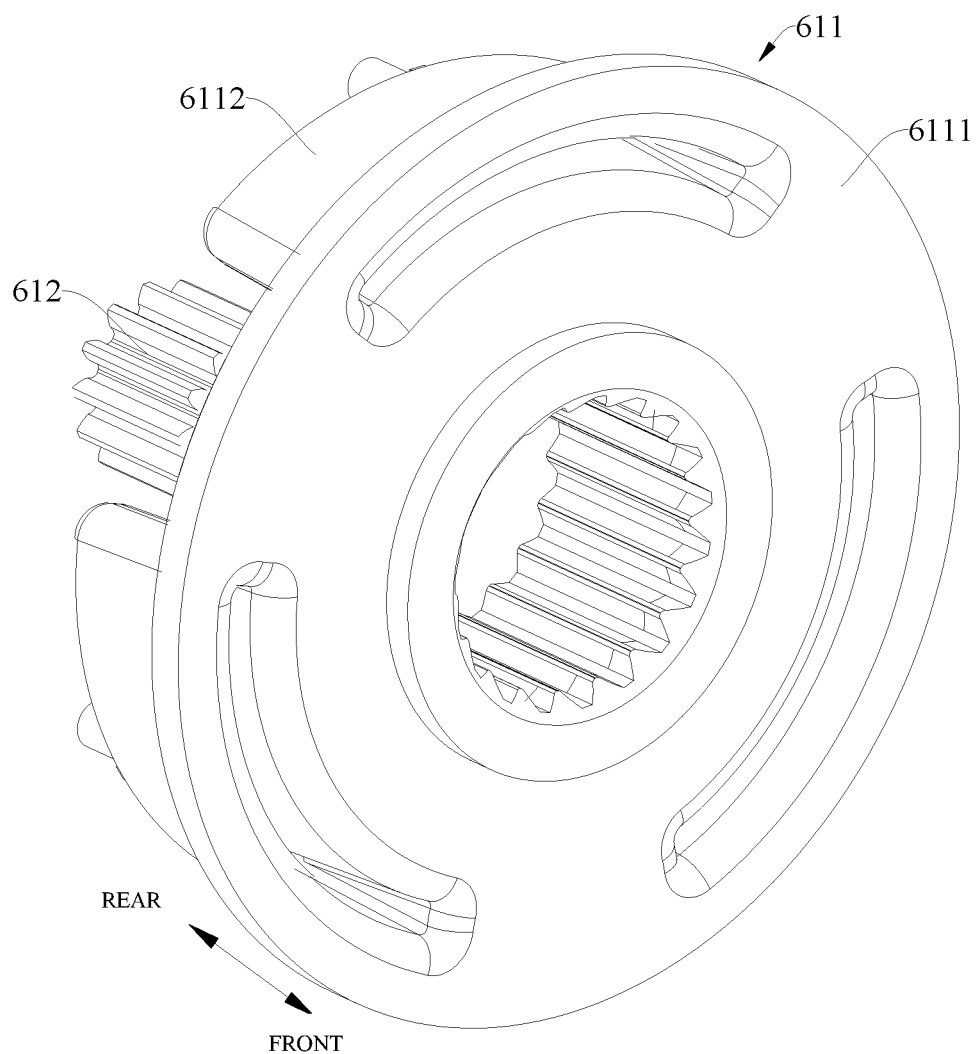
FIG. 10 is a schematic assembly view of the planet carrier and the planetary gear shown in FIG. 8.

Referring to FIGS. 8 to 10, the planet carrier 611 includes a planetary gear support 6111 and a planetary gear fixing disk 6116. A plurality of planetary gears 612 are rotatably mounted on one side surface of the planetary gear support 6111, and one side surface of the planetary gear support 6111 is provided with a plurality of mounting bosses 6112. The planetary gear fixing disk 6116 is mounted on the plurality of mounting bosses 6112, which facilitates the connection of the planetary gear support 6111 and the planetary gear fixing disk 6116.

In some examples, the planetary gear support 6111 and the planetary gear fixing disk 6116 are both located in the planetary gear outer teeth casing 613, and the planetary gear support 6111 and the planetary gear fixing disk 6116 are stopped at two sides of internal teeth of the planetary gear outer teeth casing 613 respectively, positioning in an axial direction of the planetary gear outer teeth casing 613 by means of the internal teeth end of the planetary gear outer teeth casing 613. The plurality of planetary gears 612 may be positioned and mounted by the planetary gear support 6111. The combined structure of the planetary gear support 6111 and the planetary gear fixing disk 6116 may define the plurality of planetary gears between the planetary gear support 6111 and the planetary gear fixing disk 6116, realizing modular assembly of the structure, a more compact structure and convenient assembly.

In some examples, the planetary gear fixing disk 6116 is provided in the planetary gear outer teeth casing 613 and is secured to the planetary gear support 6111 by a fastener for reliable connection.

In some examples, one side surface of the planetary gear support 6111 is provided with a plurality of planetary gear mounting seats 6114, and each of the planetary gear mounts 6114 is provided with a planetary gear fixing shaft 6115, and the plurality of planetary gears 612 are rotatable respectively and mounted in one-to-one correspondence to the plurality of planetary gear fixing shafts 6115. Here, "one-to-one correspondence" may be construed as the equal number of planetary gears 612 and planetary gear mounting seats 6114, and each of the planetary gear mounting seats 6114 is provided with one planetary gear 612.

In some specific examples, the planetary gear mounting seat 6114 is provided with a plughole, one end of the planetary gear fixing shaft 6115 is inserted into the plughole of the planetary gear mounting seat 6114, and the other end of the planetary gear fixing shaft 6115 is placed in a limiting hole 6118 of the planetary gear fixing disk 6116, positioning and mounting the planetary gear 612.

In some examples, one side surface of the planetary gear support 6111 is provided with a plurality of mounting bosses 6112 and a plurality of planetary gear mounting seats 6114, the plurality of mounting bosses 6112 and the plurality of planetary gear mounting seats 6114 are arranged alternately in a circumferential direction of the planetary gear support 6111, and the plurality of mounting bosses 6112 and the plurality of planetary gears 612 are arranged alternately in a circumferential direction of the planetary gear support 6111.

Furthermore, each of the mounting bosses 6112 is provided with a positioning column 6113, the planetary gear fixing disk 6116 is provided with a plurality of positioning holes 6117, the positioning columns 6113 on the plurality of mounting bosses 6112 are in a close fit or welded in the plurality of positioning holes 6117 in one-to-one correspondence, and the planetary gear fixing disk 6116 is supported on the plurality of mounting bosses 6112, implementing the assembly of the planetary gear fixing disk 6116 and the planetary gear support 6111, with convenient connection.

Figure 7:
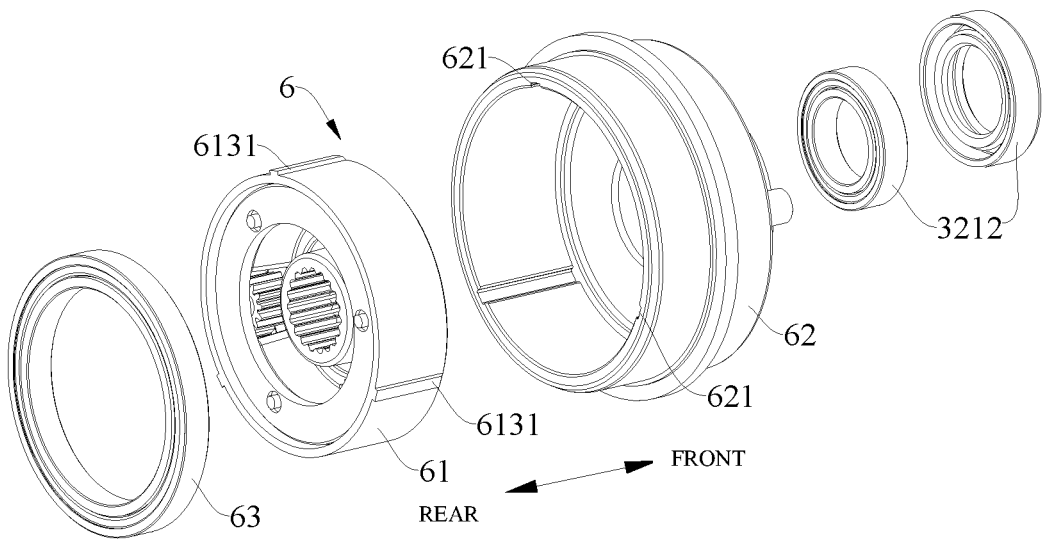
FIG. 7 is an exploded view of the planetary gear assembly of the drum washing machine.
Figure 11:
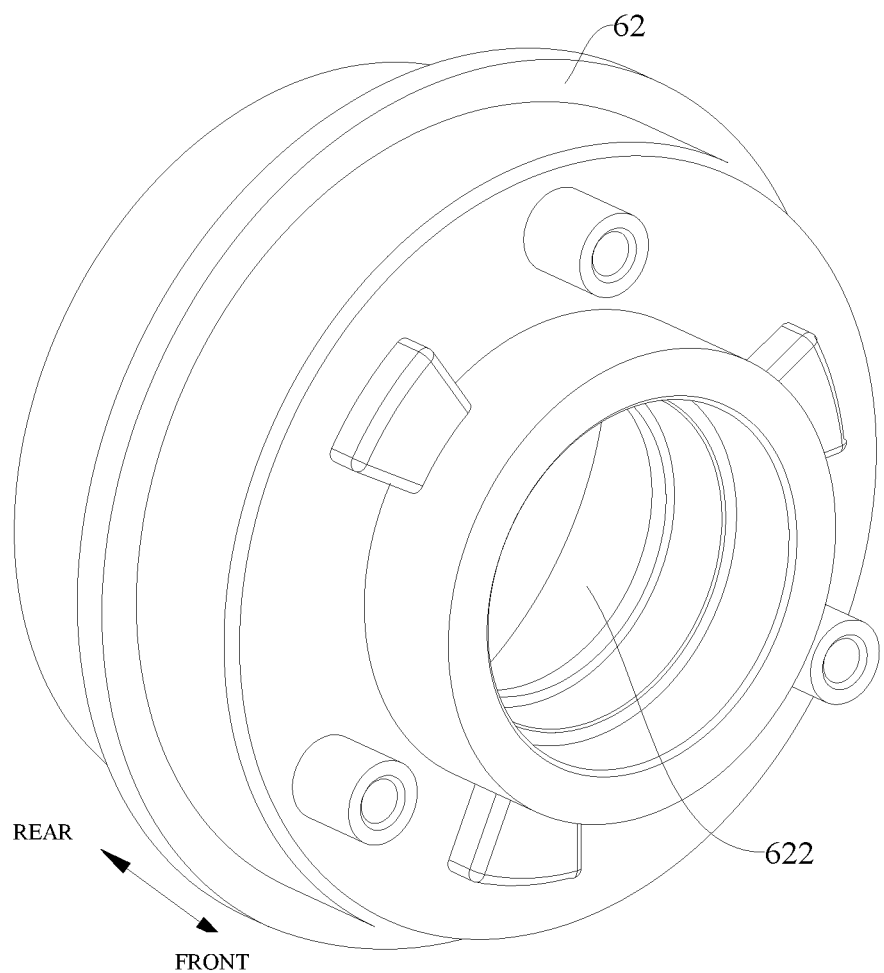
FIG. 11 is a schematic structural diagram of a planetary gear casing shown in FIG. 7.

As shown in FIGS. 7, 8, and 11, according to a further embodiment of the present disclosure, the planetary gear assembly 6 further includes: a planetary gear casing 62 which is provided therein with the planetary gear component 61 to implement the modular design of the planetary gear assembly 6. The planetary gear outer teeth casing 613 is in transmission connection with the agitator 4 via the planetary gear casing 62. For example, the planetary gear casing 62 and the agitator 4 may be combined by screws, and the planetary gear outer teeth casing 613, the planetary gear casing 62 and the agitator 4 are fixedly connected to realize synchronous operation and facilitate the planetary gear assembly 6 to transmit the torque of the main shaft 31 to the agitator 4.

In some examples, one of an inner peripheral wall of the planetary gear casing 62 and an outer peripheral wall of the planetary gear outer teeth casing 613 is provided with a flange 6131, the other of the inner peripheral wall of the planetary gear casing 62 and the outer peripheral wall of the planetary gear outer teeth casing 613 is provided with a latching slot 621, and the flange 6131 is fitted in the latching slot 621 to ensure a fixed connection between the planetary gear casing 62 and the planetary gear outer teeth casing 613.

In some embodiments, the outer peripheral wall of the planetary gear outer teeth casing 613 is provided with a plurality of flanges 6131, each of the flanges 6131 extends in the axial direction of the planetary gear outer teeth casing 613, and the plurality of flanges 6131 are spaced apart from each other in the circumferential direction of planetary gear outer teeth casing 613.

Correspondingly, the inner peripheral wall of the planetary gear casing 62 is provided with a plurality of latching slots 621. Each of the latching slots 621 extends in the axial direction of the planetary gear casing 62, and the plurality of latching slots 621 are spaced apart from each other in the circumferential direction of the planetary gear casing 62. The plurality of flanges 6131 are fitted in the plurality of latching slots 621 in one-to-one correspondence, which not only implement the connection between the planetary gear outer teeth casing 613 and the planetary gear casing 62, but also ensure the circumferential positioning of the planetary gear outer teeth casing 613 and the planetary gear casing 62, and realize the synchronous operation of the planetary gear outer teeth casing 613 and the planetary gear casing 62.

It will be appreciated that the positions of the plurality of flanges 6131 and the positions of the plurality of latching slots 621 are interchangeable, e.g., the plurality of flanges 6131 are all provided at the inner circumferential wall of the planetary gear casing 62, and the plurality of latching slots 621 are all provided at the outer peripheral wall of the planetary gear outer teeth casing 613, or some of the plurality of flanges 6131 are provided on the outer peripheral wall of the planetary gear outer teeth casing 613, and some other of the plurality of flanges 6131 are provided on the inner peripheral wall of the planetary gear casing 62, and the plurality of latching slots 621 are also provided correspondingly at the outer peripheral wall of the planetary gear outer teeth casing 613 and the inner peripheral wall of the planetary gear casing 62 respectively, for convenient connection.

Figure 21:
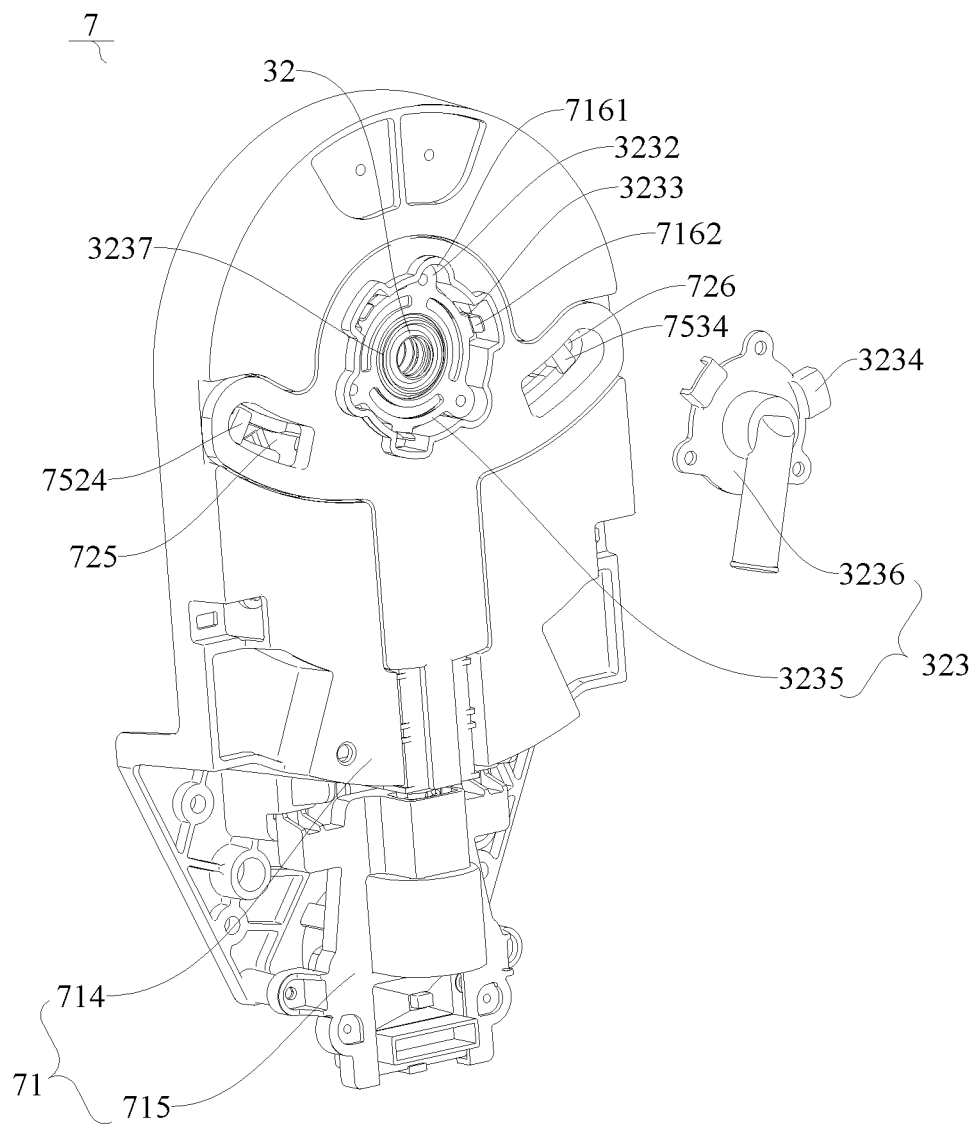
FIG. 21 is a perspective view of the brake of a drum washing machine according to an embodiment of the present disclosure and an adapter.
Figure 23:
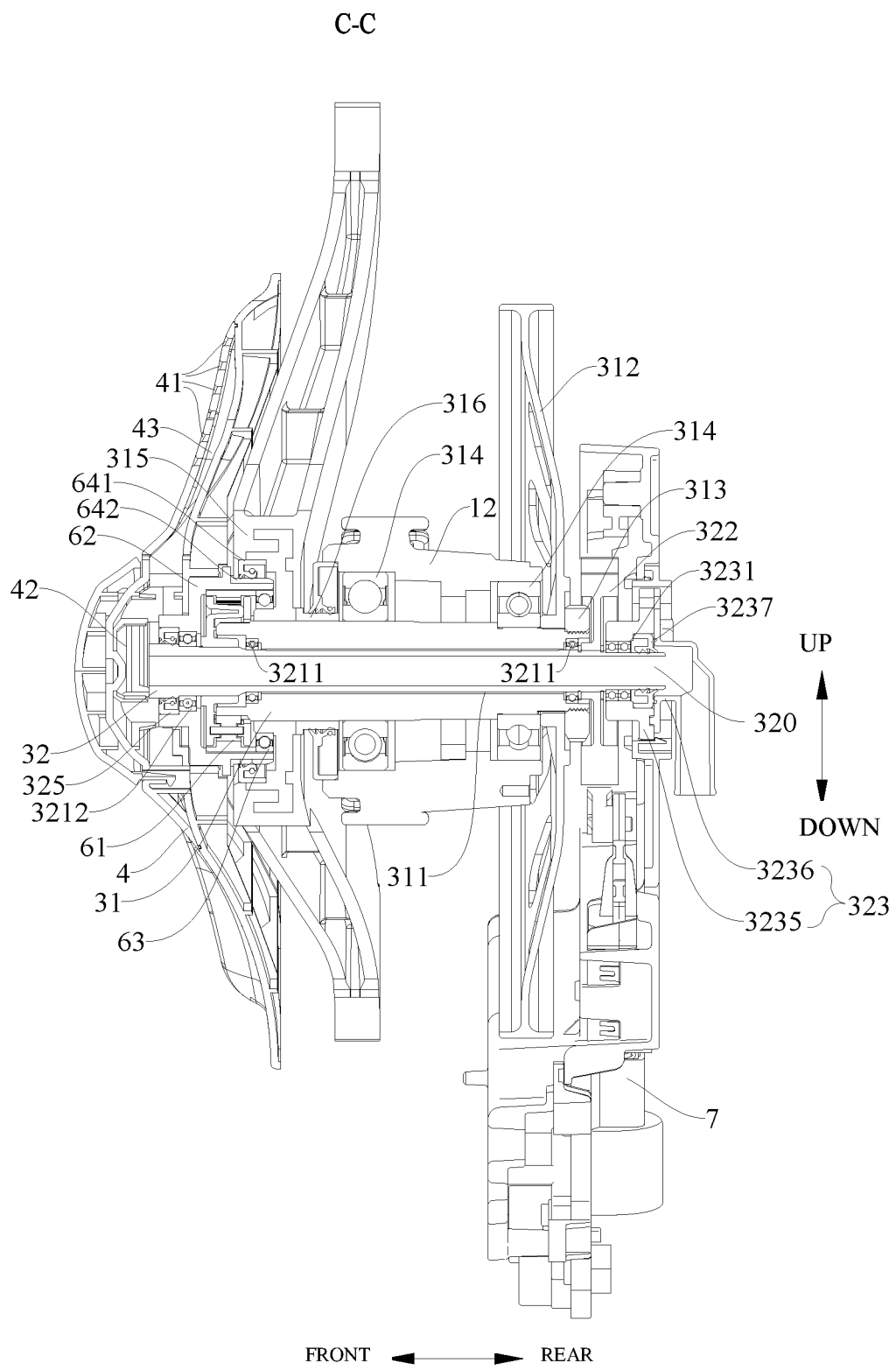
FIG. 23 is a sectional view taken along line C-C of FIG. 22.

As shown in FIG. 7, in conjunction with FIGS. 1, 21 and 23, according to a still further embodiment of the present disclosure, the planetary gear assembly 6 further includes: a planetary gear bearing 63 provided in the planetary gear casing 62 and located on the outer side of the planetary gear component 61, an inner race of the planetary gear bearing 63 is fitted over the main shaft 31 and rotates with the main shaft 31, an outer race of the planetary gear bearing 63 is connected to the planetary gear casing 62 and rotates with the planetary gear casing 62, and by providing the planetary gear bearing 63, it is ensured that the planetary gear casing 62 rotates relative to the main shaft 31.

According to an embodiment of the present disclosure, the drum washing machine 100 further includes a second shaft 32 and a brake 7, and the second shaft 32 meshes with the planet carrier 611, and the brake 7 controls whether the planet carrier 611 is braked through the second shaft 32.

In some examples, the side peripheral wall of the second shaft 32 is provided with a spline. That is, the second shaft 32 forms a spline shaft, and the planet carrier 611 is provided with a spline groove engaged with the spline of the second shaft 32, and the second shaft 32 is fixedly connected to the planet carrier 611 through the engagement of the spline and the spline groove to ensure the synchronous operation of the second shaft 32 and the planet carrier 611.

When the brake 7 brakes the second shaft 32, the planet carrier 611 is braked and unable be rotated; when the brake 7 is disengaged from the second shaft 32, the planet carrier 611 is in a free state. Therefore, by providing the brake 7, the operating state of the second shaft 32 is switchable, switching the planetary gear assembly 6 between the first and second states. The planetary gear assembly 6 switched between the first and second states may adjust the rotation direction of the agitator 4 to rotate the agitator 4 and the drum 2 in the same direction and in opposite directions, cooperating with the drum 2 to form operating modes suitable for different operating conditions.

In some examples, the main shaft 31 has a cavity 311 extending therethrough in the axial direction thereof, and the second shaft 32 penetrates through the cavity 311. For example, a central axis of the main shaft 31 is parallel to and coincident with a central axis of the second shaft 32, and the main shaft 31 is rotatable relative to the second shaft 32, driving the drum 2 and the agitator 4 to rotate respectively to ensure the normal operation of the drum washing machine 100.

In some embodiments, the second shaft 32 is supported by a second shaft bearing 3211 fitted thereon and provided in the cavity 311. In one embodiment, at least two second shaft bearings 3211 are provided in the cavity 311 of the main shaft 31, and the second shaft 32 passes through the at least two second shaft bearings 3211 to be supported in the cavity 311 of the main shaft 31 and to be rotatable with respect to the main shaft 31.

In some examples, the planetary gear casing 62 is provided with a through hole 622, the second shaft 32 penetrates through the through hole 622, and the second shaft 32 is supported by a second shaft end bearing 3212 fitted thereon and provided in the through hole 622. Thus, one end of the planetary gear casing 62 is supported on the second shaft 32 by the second shaft end bearing 3212, and the other end of the planetary gear casing 62 is supported on the main shaft 31 by the planetary gear bearing 63, which not only positions and mounts the planetary gear assembly 6, but also ensure the rotation of the planetary gear casing 62 relative to the second shaft 32 and the main shaft 31.

As shown in FIGS. 12 to 23, in some examples, the brake 7 includes a brake disk 322, a brake pawl 75, a brake lever 72, and a brake driver 73.

The brake disk 322 is connected to the second shaft 32 and linked with the planetary gear assembly 6 via the second shaft 32. When the brake disk 322 is braked, the second shaft 32 and the planet carrier 611 are braked; when the brake disk 322 is allowed to rotate freely, the second shaft 32 and the planet carrier 611 are allowed to rotate freely, and the second shaft 32 and the planet carrier 611 are in a free state. Thus, when the brake disk 322 is allowed to rotate freely, the planetary gear assembly 6 is in the first state, and when the brake disk 322 is braked, the planetary gear assembly 6 is in the second state.

The brake seat 71 is provided with a slideway 711. The brake pawl 75 is provided to the brake seat 71, switchable between the tightening state and the releasing state. The brake pawl 75 in the tightening state holds the brake disk 322 tightly to brake the brake disk, and the brake pawl 75 in the releasing state releases the brake disk 322 to allow the brake disk to rotate freely. The brake lever 72 is slidably fitted with the slideway 711 between the extending and retracting positions, the brake lever 72 is linked with the brake pawl 75, the brake lever 72 switches the brake pawl 75 to the tightening state when located at the extending position and switches the brake pawl 75 to the releasing state when located at the retracting position. The brake driver 73 is mounted to the brake seat 71 and is in transmission connection with the brake lever 72, and the brake driver 73 drives the brake lever 72 to move between the extending and retracting positions. Thus, by the brake driver 73 driving the brake lever 72 to move along the slideway 711, and the brake lever 72 acting on the brake pawl 75, the brake pawl 75 holds tightly or releases the brake disk 322, and the switching is convenient.

In the brake 7 for a drum washing machine according to the embodiment of the present disclosure, the brake driver 73 drives the brake lever 72 to move between the extending position and the retracting position, and the brake lever 72 is linked with the brake pawl 75, the brake disk 322 on the second shaft 32 is held tightly or released using the brake pawl 75, the second shaft 32 is switched between the free state and the braking state, and then the torque of the main shaft 31 is transmitted to the agitator 4 through the planetary gear assembly 6 to drive the agitator 4 to rotate. Thus, the rotation of the agitator 4 may be combined with the rotation of the drum 2 into various washing modes to diversify the washing mode of the drum washing machine 100.

Moreover, the brake 7 has a small number of parts and a simpler structure. The brake driver 73 drives the brake lever 72 to move between the extending position and the retracting position, and the brake lever 72 at the extending position acts on the brake pawl 75 to hold tightly the brake disk 322, and the brake lever 72 at the retracting position acts on the brake pawl 75 to release the brake disk 322. Therefore, compared with the drum washing machine with an impeller in the related art, the brake pawl 75 directly acts on the brake disk 322 on the second shaft 32 by tight hold, which facilitates control. Due to a small number of transmission structures, power transmission is more direct, an operating state of the second shaft 32 may be stably switched, which facilitates stable transmission of power to improve the performance stability of the drum washing machine 100.

Therefore, the brake 7 for a drum washing machine according to the embodiment of the present disclosure switches a mode of the agitator 4 collaborative with the drum 2 and has the advantages of a simple structure, convenient control, stabilization, or the like.

Figure 13:
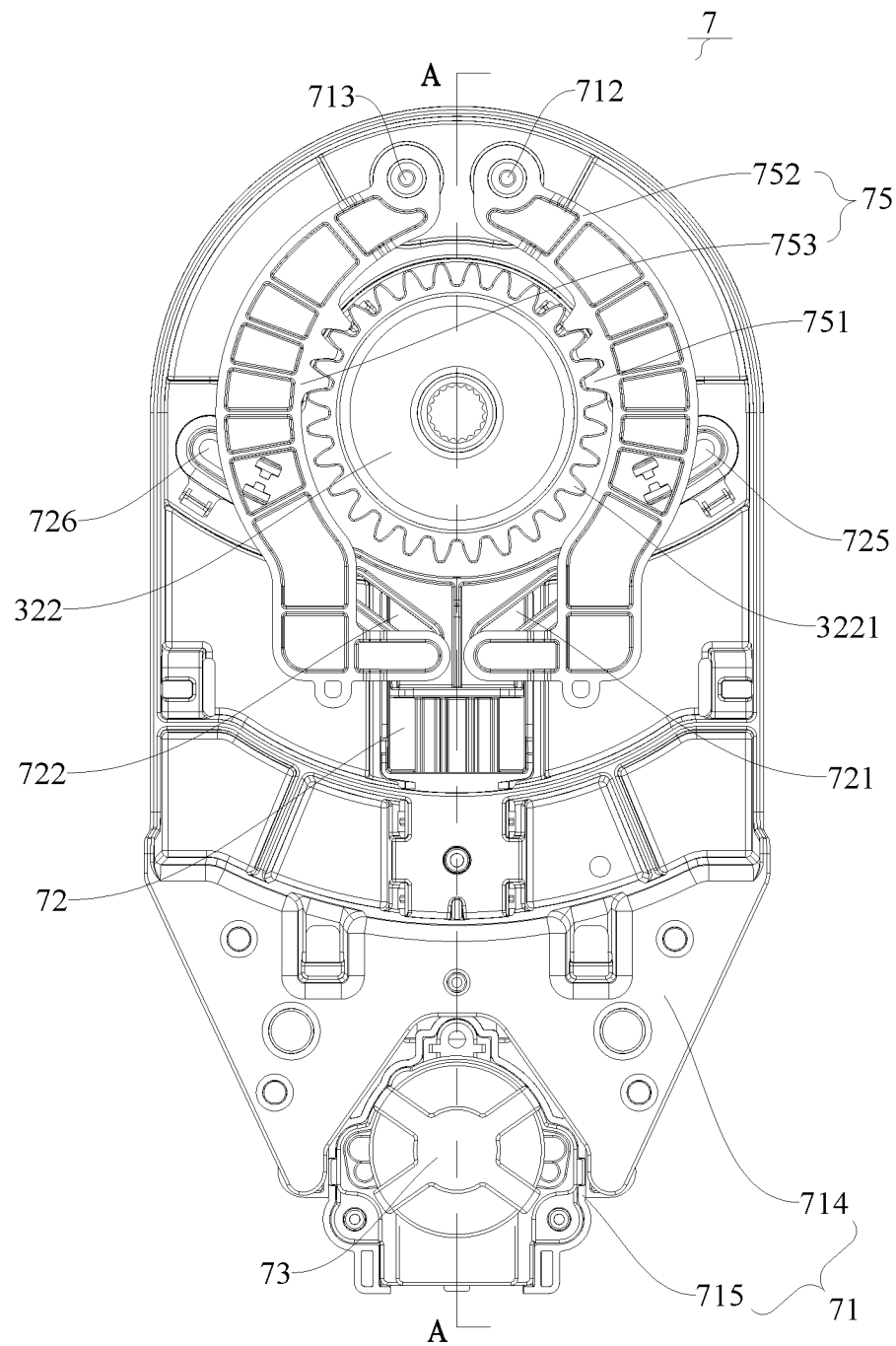
FIG. 13 is a schematic structural diagram of a brake of the drum washing machine according to an embodiment of the present disclosure, and a brake pawl is in a tightening state.
Figure 15:
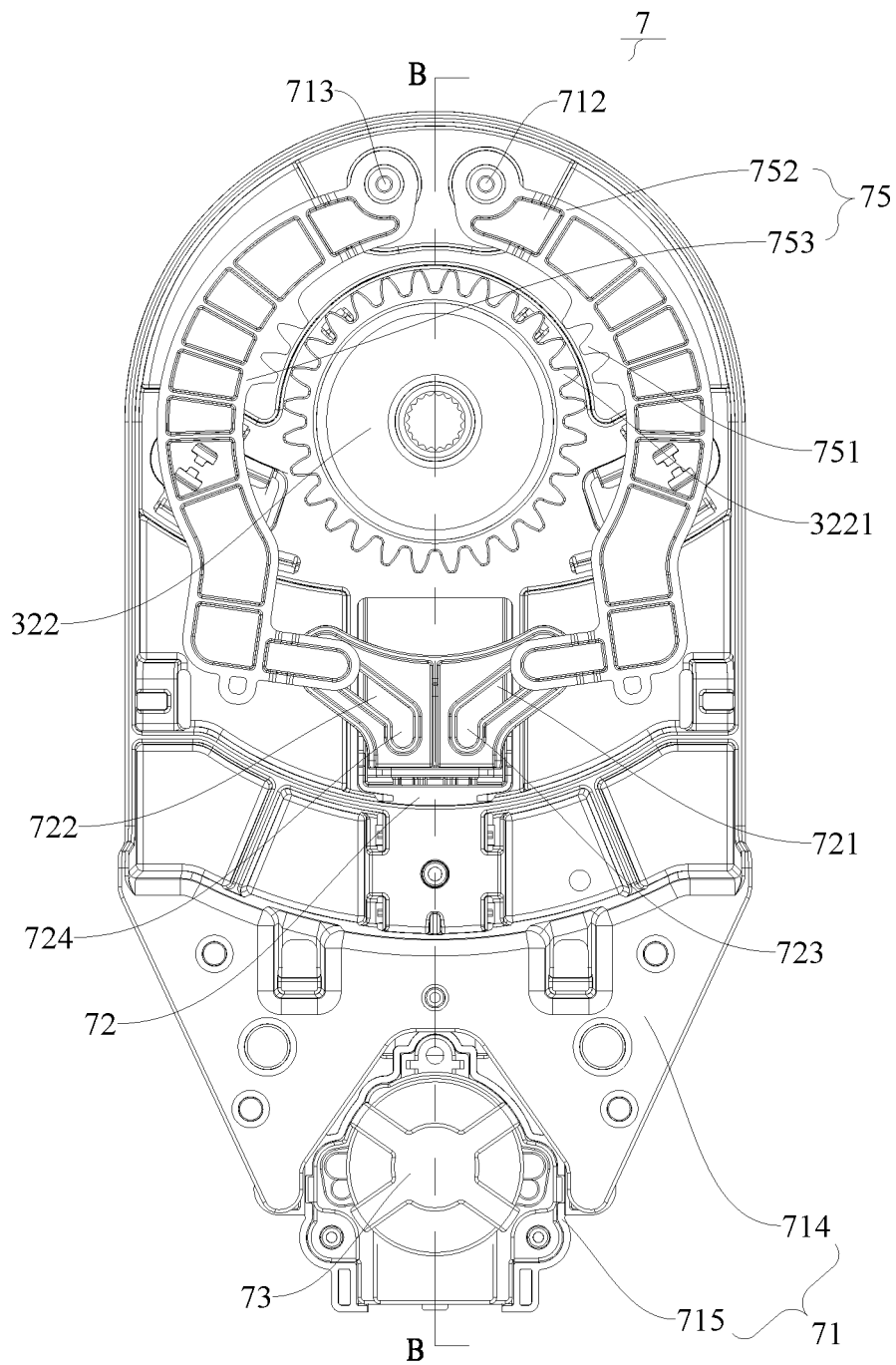
FIG. 15 is a schematic structural diagram of a brake of the drum washing machine according to an embodiment of the present disclosure, and the brake pawl is in a releasing state.
Figure 20:
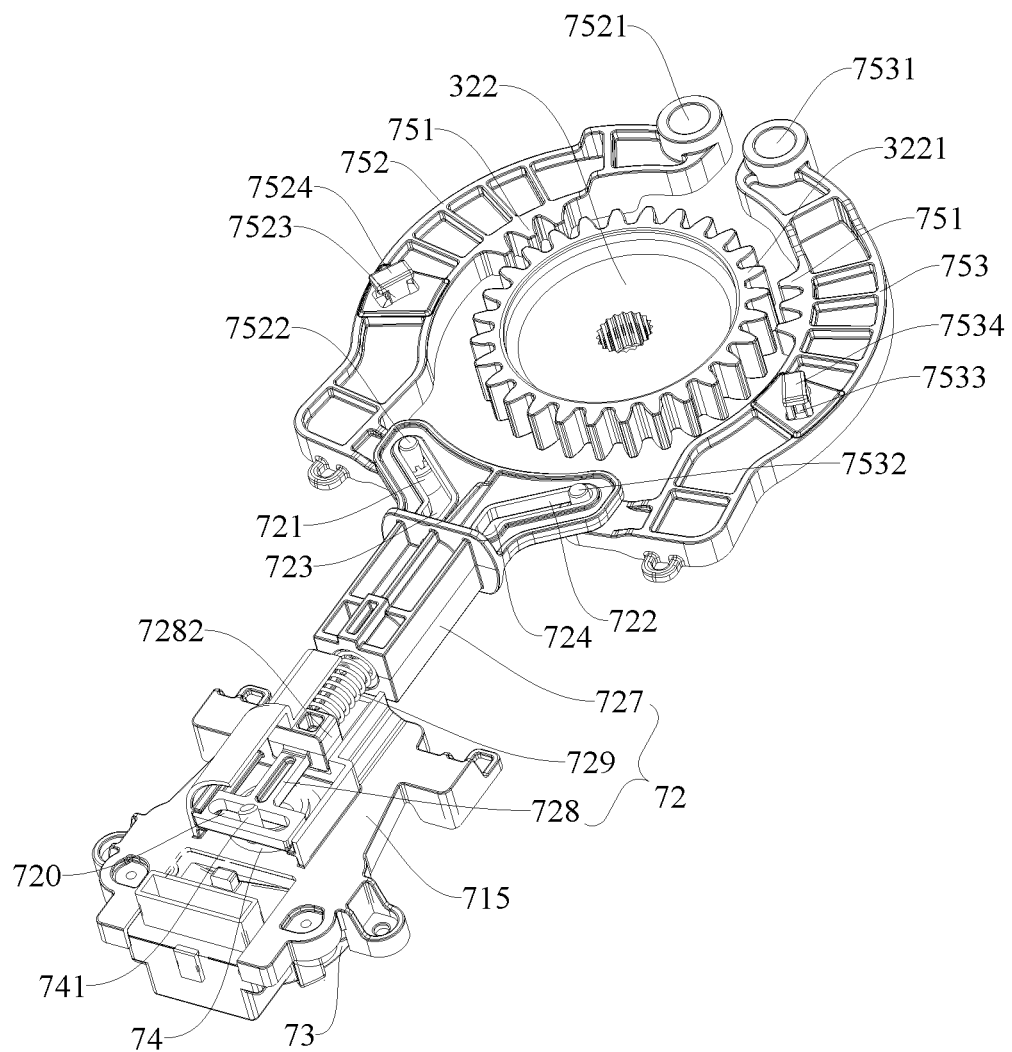
FIG. 20 is a partial perspective view of the brake of a drum washing machine according to an embodiment of the present disclosure.

Furthermore, as shown in FIGS. 13, 15 and 20, the outer circumferential surface of the brake disk 322 is provided with gear teeth 3221, and the inner side surface of the brake pawl 75 is provided with pawl teeth 751. When the brake pawl 75 is in the tightening state, the pawl teeth 751 mesh with the gear teeth 3221, and when the brake pawl 75 is in the releasing state, the pawl teeth 751 are disengaged from the gear teeth 3221, improving the reliability when the brake pawl 75 holds the brake disk 322 tightly and improving the braking reliability of the brake 7.

In some embodiments of the present disclosure, as shown in FIGS. 13-16 and 20, the brake pawl 75 includes a first pawl portion 752 and a second pawl portion 753.

One end of the first pawl portion 752 is pivotally mounted to the brake seat 71, one end of the second pawl portion 753 is pivotally mounted to the brake seat 71, the brake disk 322 is located at the first and second pawl portions 752 and 753, the gear teeth 3221 may be formed on the entire outer circumferential surface of the brake disk 322, and the pawl teeth 751 are formed at a section of the inner side surface of the first pawl portion 752 and a section of the inner side surface of the second pawl portion 753 respectively.

When the brake pawl 75 is in the tightening state, the other end of the first pawl portion 752 is adjacent to the other end of the second pawl portion 753, and the first and second pawl portions 752 and 753 hold the brake disk 322 tightly together, and the brake disk 322 is braked. When the brake pawl 75 is in the releasing state, the other end of the first pawl portion 752 is away from the other end of the second pawl portion 753, and the first and second pawl portions 752 and 753 release the brake disk 322, and the brake disk 322 is allowed to rotate freely.

In order to further improve the braking reliability when the first and second pawl portions 752 and 753 hold the brake disk 322 tightly, at least a part of the first pawl portion 752 is configured to be in a shape of an arc that matches a shape of the brake disk 322, and at least a part of the second pawl portion 753 is configured to be in a shape of an arc that matches a shape of the brake disk 322.

In one embodiment, the present disclosure is not limited thereto, and the brake pawl 75 may have other structural forms, e.g., a shape of an open elastic ring, and hold tightly or release the brake disk 322 under the action of the brake lever 72.

In one embodiment, as shown in FIGS. 13, 15 and 20, a first rotation column 712 and a second rotation column 713 are provided in the brake base 71, the first pawl portion 752 is provided with a first pivot hole 7521 pivotally fitted over the first rotation column 712, and the second pawl portion 753 is provided with a second pivot hole 7531 pivotally fitted over the second rotation column 713. Therefore, the one end of the first pawl portion 752 and the one end of the second pawl portion 753 may be pivotally mounted to the brake seat 71 respectively.

In some embodiments of the present disclosure, as shown in FIGS. 13, 15, and 20, the brake lever 72 is provided with a first drive chute 721 and a second drive chute 722 which are obliquely respect to the sliding direction of the brake lever 72 respectively.

For example, an end of the first drive chute 721 away from the brake disk 322 and an end of the second drive chute 722 away from the brake disk 322 are adjacent to each other, and one end of the first drive chute 721 adjacent to the brake disk 322 and one end of the second drive chute 722 adjacent to the brake disk 322 are away from each other. Here, "adjacent to each other" and "away from each other" are relative. That is, a distance between the first drive chute 721 and one end of the second drive chute 722 adjacent to the brake disk 322 is greater than a distance between the first drive chute 721 and an end of the second drive chute 722 away from the brake disk 322.

The other end of the first pawl portion 752 is provided with a first drive column 7522 slidably fitted with the first drive chute 721, and the other end of the second pawl portion 753 is provided with a second drive column 7532 slidably fitted with the second drive chute 722.

Thus, when the brake lever 72 moves from the retracting position to the extending position, i.e., to the direction of the brake disk 322, the first drive chute 721 rotates the first pawl portion 752 around the first rotation column 712 by driving the first drive column 7522, the second drive chute 722 rotates the second pawl portion 753 around the second rotation column 713 by driving the second drive column 7523, the other end of the first pawl portion 752 and the other end of the second pawl portion 753 are adjacent to each other, and the brake pawl 75 is switched to the tightening state.

When the brake lever 72 moves from the extending position to the retracting position, i.e., to the direction apart from the brake disk 322, the first drive chute 721 rotates the first pawl portion 752 around the first rotation column 712 by driving the first drive column 7522, the second drive chute 722 rotates the second pawl portion 753 around the second rotation column 713 by driving the second drive column 7523, the other end of the first pawl portion 752 and the other end of the second pawl portion 753 are away from each other, and the brake pawl 75 is switched to the releasing state.

Furthermore, the brake lever 72 is provided with a first limiting groove 723 and a second limiting groove 724. The first and second limiting grooves 723 and 724 are parallel to the sliding direction of the brake lever 72 respectively. The first limiting groove 723 is in communication with one end of the first drive chute 721 apart from the brake disk 322, and the first limiting groove 723 extends from the first drive chute 721 in a direction away from the brake disk 322, the second limiting groove 724 is in communication with one end of the second drive chute 722 apart from the brake disk 322, and the second limiting groove 724 extends from the second drive chute 722 in a direction away from the brake disk 322.

When the brake lever 72 slides to the extending position, the brake pawl 75 is in the tightening state, the first drive column 7522 slides into the first limiting groove 723, and the second drive column 7532 slides into the second limiting groove 724. Since the directions of the first and second limiting grooves 723 and 724 are perpendicular to a tangential direction of opening and closing the first and second pawl portions 752 and 753, when the brake pawl 75 is in the tightening state, the force transmitted from the brake disk 322 to the brake pawl 75 is converted to have a tangential direction, without causing a reverse thrust to the brake driver 73.

In some specific examples of the present disclosure, as shown in FIGS. 13, 15, and 19-22, the brake seat 71 is provided with a first guide chute 725 and a second guide chute 726, and the first and second guide chutes 725 and 726 are obliquely respect to the sliding direction of the brake lever 72 respectively. For example, in the direction of the braking lever 72 from the retracting position to the extending position, the distance between the first and second guide chutes 725 and 726 increases gradually.

A first guide column 7523 is provided between two ends of the first pawl portion 752, and slidably fitted with the first guide chute 725. A second guide column 7533 is provided between two ends of the second pawl portion 753, and slidably fitted with the second guide chute 726. Thus, the movement trajectories of the first and second pawl portions 752 and 753 may be restrained, smoothing the movements of the first and second pawl portions 752 and 753 and improving the performance reliability of the brake pawl 75.

The portion of the brake seat 71 where the first and second guide chutes 725 and 726 are provided may be configured as a separate piece or a single piece.

Figure 24:
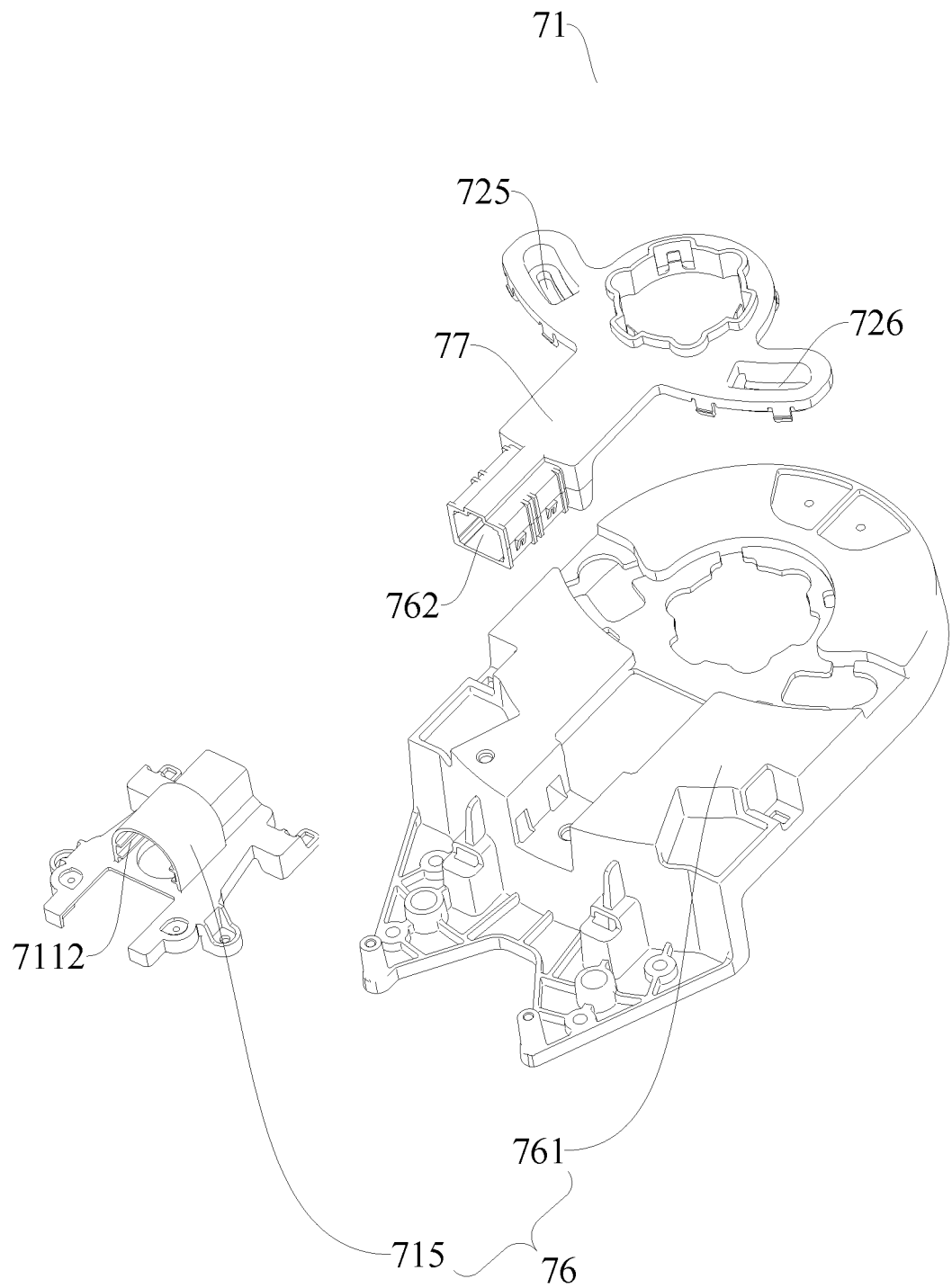
FIG. 24 is an exploded view of a brake seat of the brake of a drum washing machine according to an embodiment of the present disclosure.

For example, as shown in FIG. 24, the brake seat 71 includes a brake base 76 and a brake coverplate 77. The brake coverplate 77 is detachably mounted to the brake base 76, the brake coverplate 77 is provided with a guide chute, the brake pawl 75 is provided at the brake base 76, and the brake pawl 75 is provided with a guide column slidably fitted with the guide chute.

In one embodiment, the first and second pawl portions 752 and 753 of the brake pawl 75 are pivotally mounted to the brake base 76 respectively. For example, the brake base 76 is provided therein with a first rotation column 712 and a second rotation column 713, the first pawl portion 752 is provided with a first pivot hole 7521 pivotally fitted over the first rotation column 712 penetrates pivotally, and the second pawl portion 753 is provided with a second pivot hole 7531 pivotally fitted over the second rotation column 713.

The guide chute includes a first guide chute 725 and a second guide chute 726. The first guide chute 725 and the second guide chute 726 are obliquely respect to the sliding direction of the brake lever 72 respectively, the guide column includes a first guide column 7523 and a second guide column 7533, the first guide column 7523 is provided between two ends of the first pawl portion 752 and slidably fitted with the first guide chute 725, and the second guide column 7533 is provided between two ends of the second pawl portion 753 and slidably fitted with the second guide chute 726.

In one embodiment, as shown in FIG. 24, the brake base 76 includes a main base 761 and a support 715, and the support 715 is detachably mounted to the main base 761, the brake coverplate 77 is detachably mounted to the main base 761, the brake pawl 75 is mounted to the main base 761 and the brake driver 73 is mounted to the support 715. The slideway 711 includes a coverplate section 762 and a support section 7112 spaced apart from each other, the coverplate section 762 is formed to the brake coverplate 77 and the support section 7112 is formed to the support 715, the shifter lever 727 is slidably fitted with the coverplate section 762 and the transmission bar 728 is slidably fitted with the support section 7112.

Thus, by designing the brake seat 71 as a split type, the guide chute is provided using the brake coverplate 77, and the brake driver 73 is mounted using the support 715, which facilitates the disassembly and assembly, production, maintenance, or the like of the whole brake 7.

In some specific examples of the present disclosure, the end portion of the first guide column 7523 is provided with a first anti-off head 7524, and the end portion of the second guide column 7533 is provided with a second anti-off head 7534. The first anti-off head 7524 may prevent the first guide column 7523 from escaping from the first guide chute 725, and the second anti-off head 7534 may prevent the second guide column 7533 from escaping from the second guide chute 726.

In some embodiments of the present disclosure, as shown in FIGS. 13-16, 19 and 20, the brake lever 72 includes a shifter lever 727, a transmission bar 728, and a brake compression spring 729.

The shifter lever 727 is linked with the brake pawl 75. The first drive chute 721, the second drive chute 722, the first limiting groove 723 and the second limiting groove 724 are all provided on the shifter lever 727. The transmission bar 728 is in transmission connection with the brake driver 73, and the transmission bar 728 is hooked to the shifter lever 727. In one embodiment, the shifter lever 727 is provided with a hooking surface 7271 facing the brake disk 322, the transmission bar 728 is provided with a hook 7281, and the hook 7281 is hooked to the hooking surface 7271. The brake compression spring 729 is compressed between the shifter lever 727 and the transmission bar 728.

When the brake driver 73 drives the brake lever 72 to move from the retracting position to the extending position, the brake driver 73 first drives the transmission bar 728 to move toward the brake disk 322, and the transmission bar 728 pushes the shifter lever 727 through the brake compression spring 729 and moves the shifter lever 727 to the brake disk 322, driving the brake pawl 75 to be switched to the tightening state. When the brake driver 73 drives the brake lever 72 to move from the extending position to the retracting position, the brake driver 73 first drives the transmission bar 728 to move apart from the brake disk 322, and the transmission bar 728 pulls the hooking surface 7271 through the hook 7281, and moves the shifter lever 727 apart from the brake disk 322, driving the brake pawl 75 to be switched to the releasing state.

Furthermore, as in the process of switching the brake pawl 75 to the tightening state, the pawl teeth 751 and the gear teeth 3221 do not mesh due to the initial position of the brake disk 322, and the brake driver 73 may continue to operate, further compressing the brake compression spring 729. When the brake disk 322 is rotated by an angle, the brake pawl 75 is driven by the brake compression spring 729 to be switched to the tightening state, and the pawl teeth 751 mesh with the gear teeth 3221, i.e., the provision of the brake compression spring 729 may ensure that the pawl teeth 751 finally mesh with the gear teeth 3221.

Figure 14:
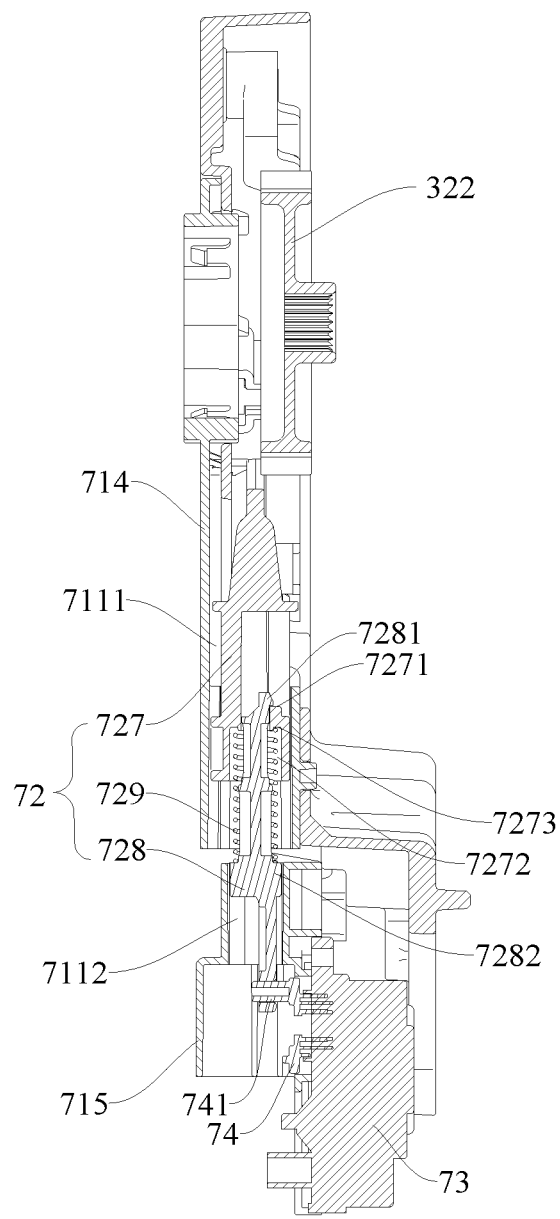
FIG. 14 is a sectional view taken along line A-A of FIG. 13.
Figure 16:
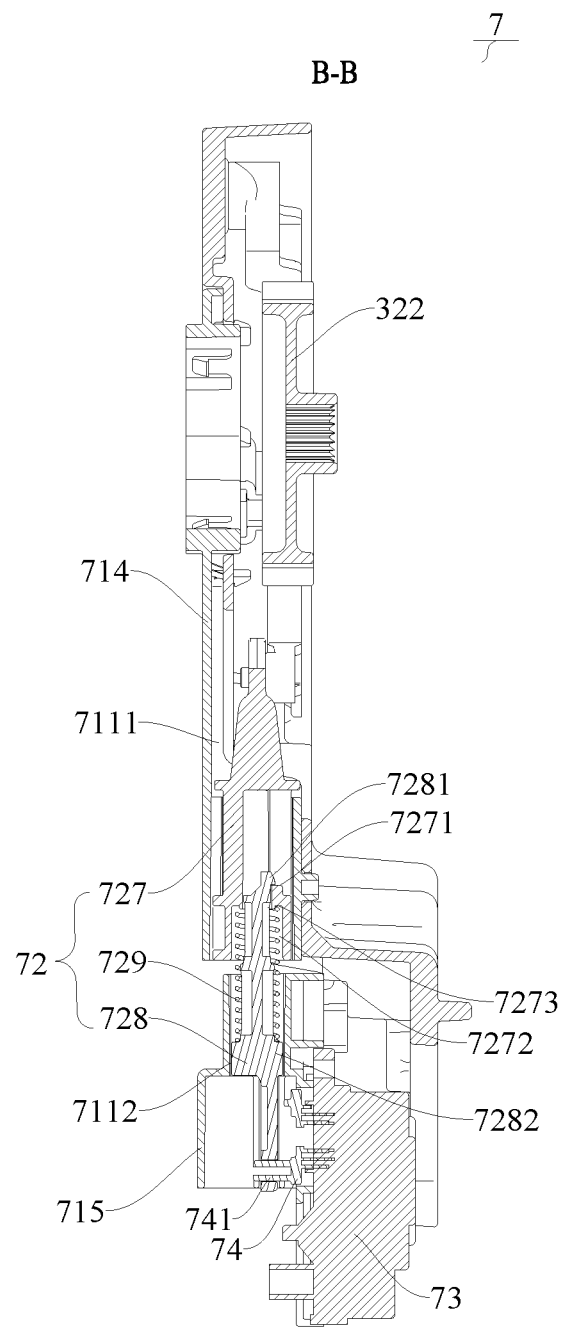
FIG. 16 is a sectional view taken along line B-B of FIG. 15.
Figure 17:
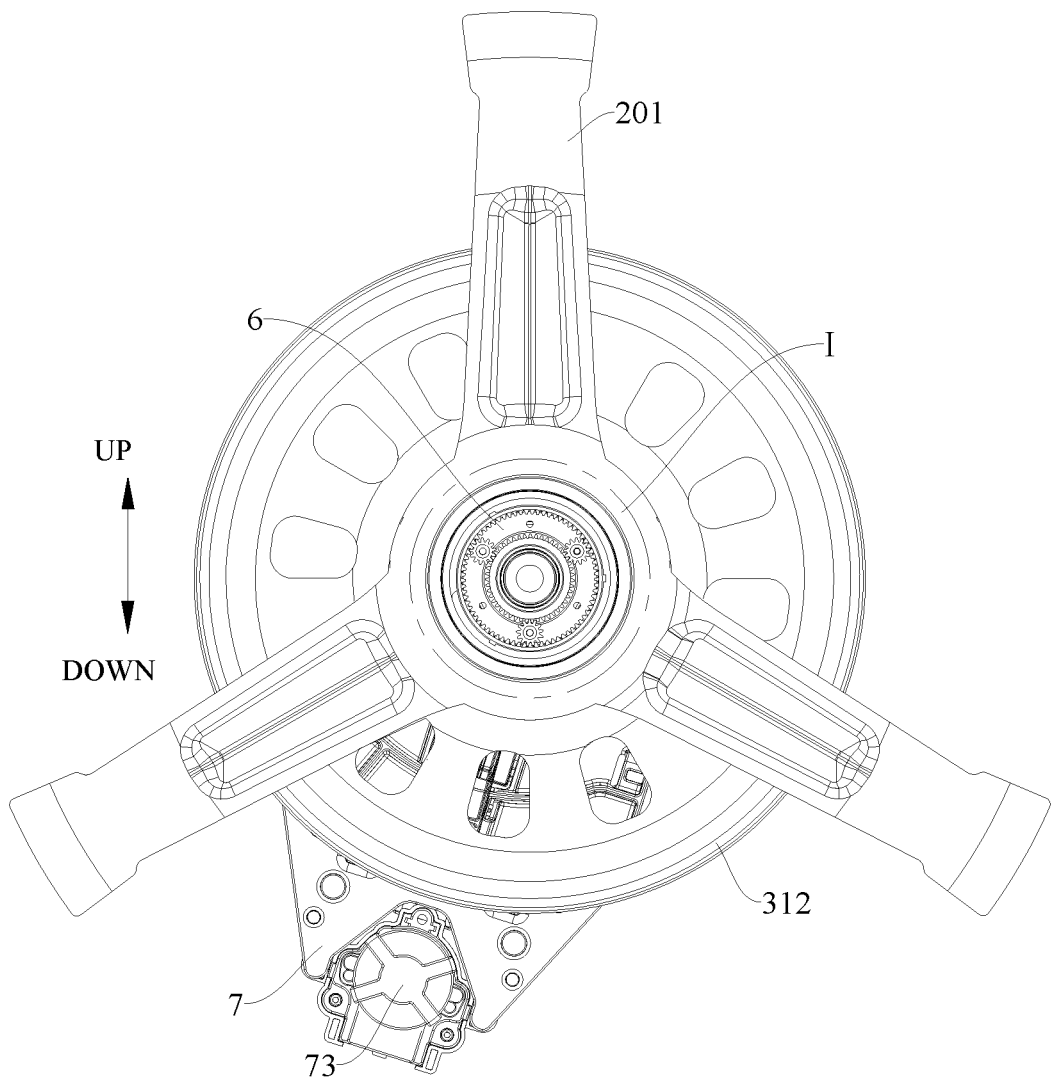
FIG. 17 is a schematic structural diagram of the drum washing machine viewed front to back, with the casing, drum and agitator removed.
Figure 18:
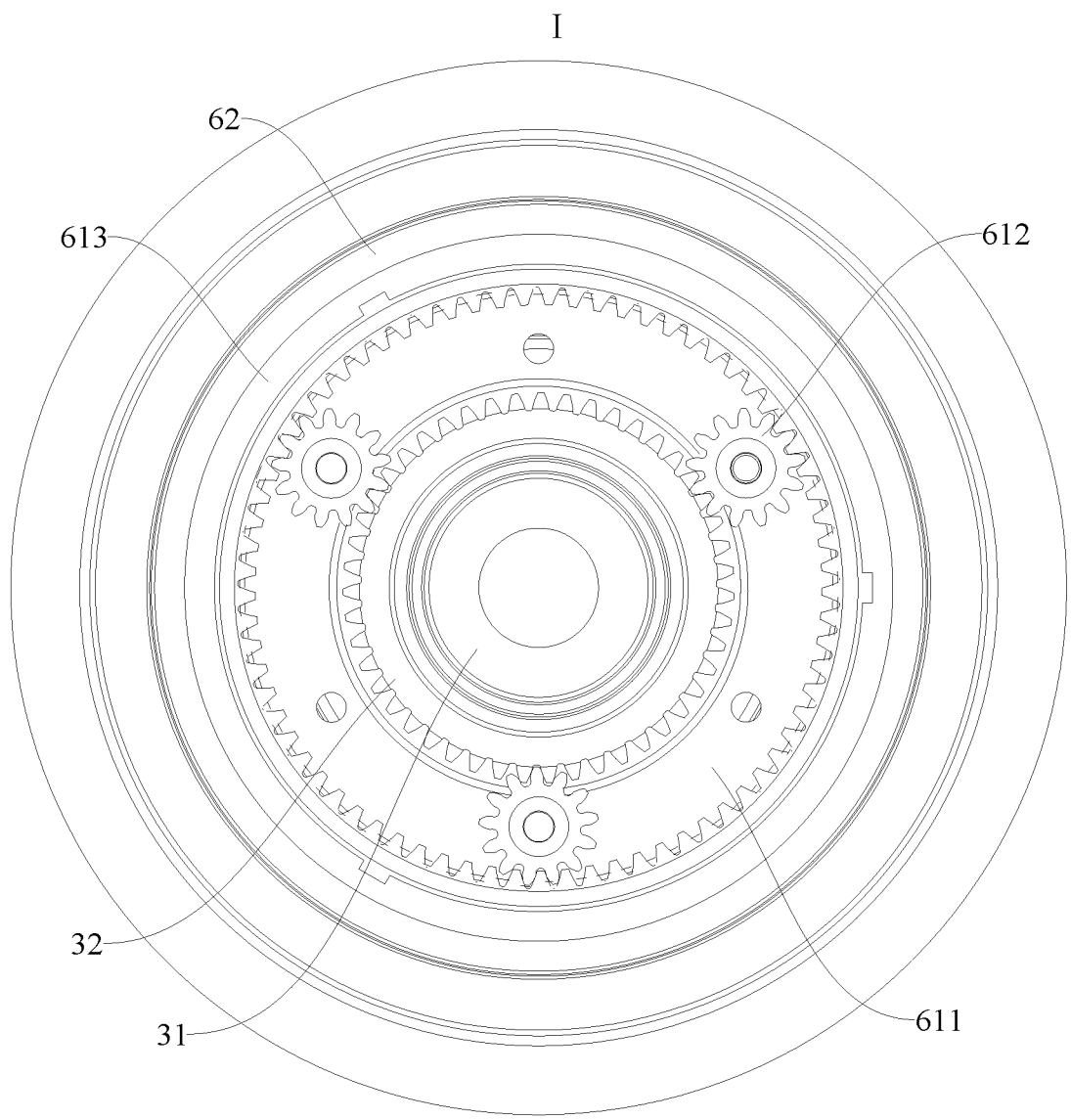
FIG. 18 is an enlarged view of I shown in FIG. 17.

In one embodiment, as shown in FIGS. 14 and 16, the shifter lever 727 is provided with a mounting cavity 7272. An opening of the mounting cavity 7272 faces the transmission bar 728, and the mounting cavity 7272 is provided therein with a stop step 7273. The transmission bar 728 is provided with a slide block 7282, and the shape of the cross section of the slide block 7282 is matched with the shape of the cross section of the slideway 711 to improve the smoothness of the transmission bar 728 sliding in the slideway 711. The brake compression spring 729 is fitted over the transmission bar 728, and the brake compression spring 729 and the transmission bar 728 extend into the mounting cavity 7272. One end of the brake compression spring 729 abuts against the stop step 7273 and the other end of the brake compression spring 729 abuts against the slide block 7282, mounting and positioning the brake compression spring 729.

In one embodiment, as shown in FIGS. 13-16 and 19-21, in order to facilitate the disassembly, assembly and maintenance of the brake 7, the brake seat 71 includes a main housing 714 and a support 715, the support 715 detachably mounted to the main housing 714. The brake pawl 75 is mounted in the main housing 714, and the brake driver 73 is mounted to the support 715.

The slideway 711 includes a housing section 7111 and a support section 7112 spaced apart from each other, the housing section 7111 is formed to the main housing 714, the support section 7112 is formed to the support 715, the shifter lever 727 is slidably fitted with the housing section 7111 and the transmission bar 728 is slidably fitted with the support section 7112.

In some specific examples of the present disclosure, as shown in FIGS. 14, 16, 19 and 20, the brake 7 further includes: a brake cam 74. The brake driver 73 is configured as an electric motor and is in transmission connected to the brake lever 72 via the brake cam 74, and the brake cam 74 may convert the rotational motion of the electric motor shaft of the electric motor into a linear motion of the brake lever 72 in the slideway 711 to ensure the normal operation of the brake 7.

In some examples, the brake cam 74 is provided with an eccentric column 741, the brake lever 72 is provided with a straight sliding groove 720, and the eccentric column 741 is slidably fitted in the straight sliding groove 720. When the electric motor drives the brake cam 74 to rotate, the eccentric column 741 of the brake cam 74 is eccentrically rotated, and since the slideway 711 limits the brake lever 72 to only move linearly in its length direction, when the eccentric column 741 slides in the straight sliding groove 720, the brake lever 72 is driven to move in the length direction of the slideway 711, with continuous operating actions, and high use reliability.

In one embodiment, the length direction of the straight sliding groove 720 is perpendicular to the linear motion direction of the brake lever 72, with a simple and compact structure, facilitating the cooperation with the brake cam 74, achieving the above functions.

According to another embodiment of the disclosure, the drum washing machine 100 further includes: a detector (not shown) for detecting power of the driver. When the detector detects that the power of the driver reaches a predetermined value, the brake 7 controls whether the planet carrier 611 is allowed to rotate freely through the second shaft 32, and the agitator 4 and the drum 2 are rotated in the same direction, and the laundry in the drum 2 is prevented from being entangled severely and torn, with high safety.

Figure 2:
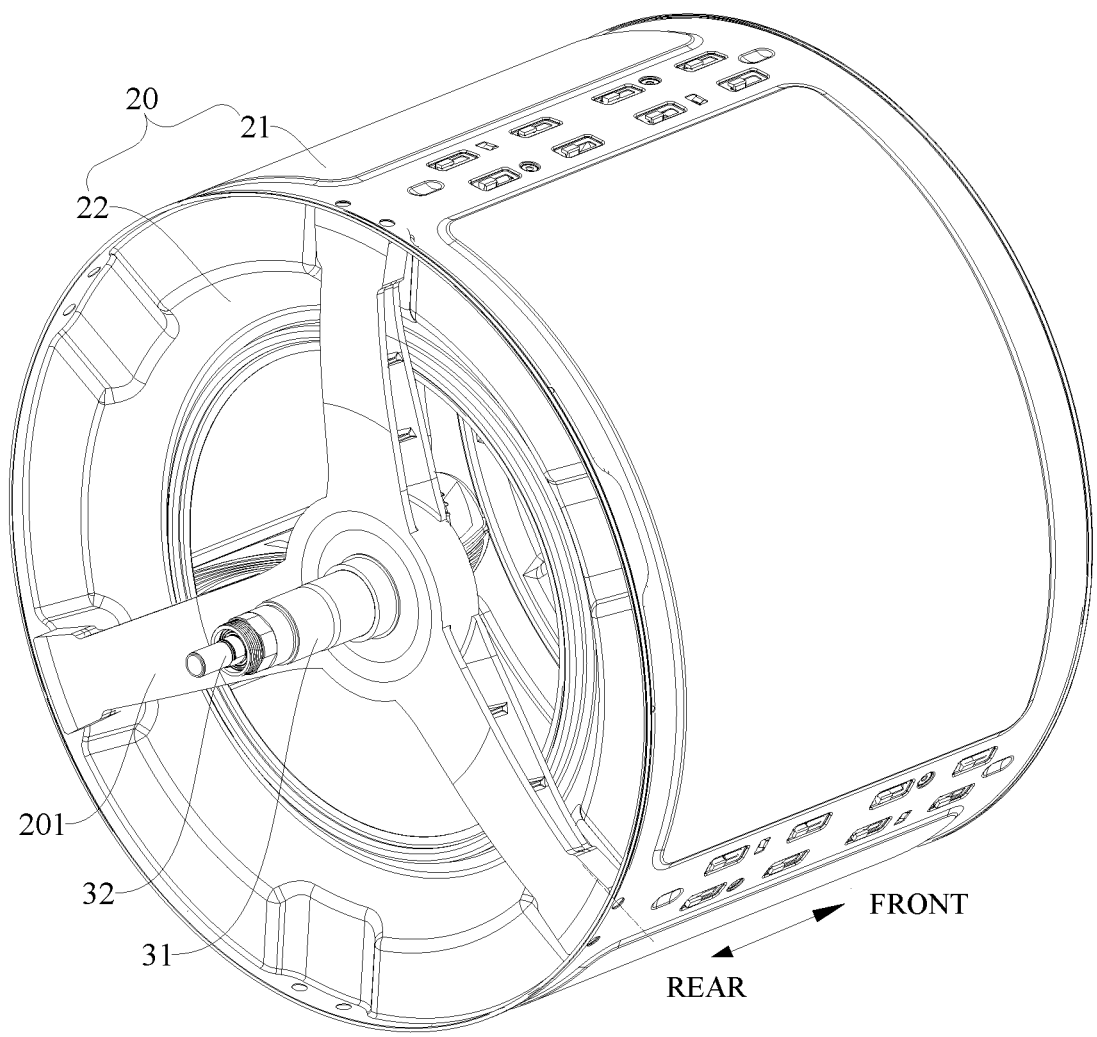
FIG. 2 is a schematic structural diagram of a drum of the drum washing machine mounted on a drum support.
Figure 3:
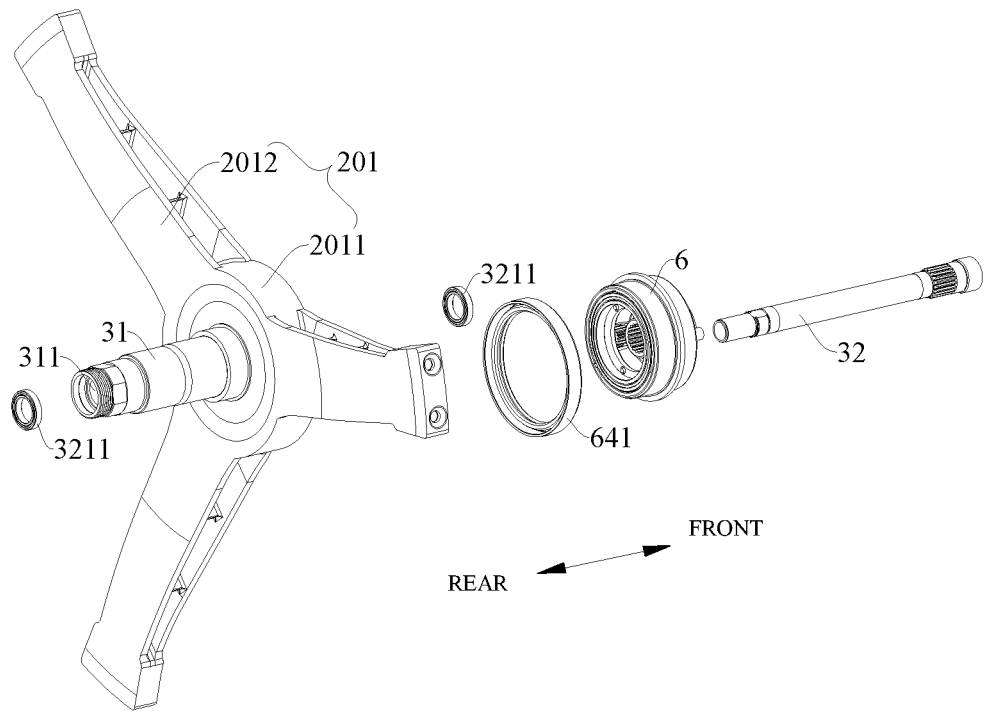

As shown in FIGS. 1-3, according to an embodiment of the present disclosure, the drum washing machine 100 further includes a drum support 201 mounted to a rear wall of the drum 2 and located between the rear wall of the drum 2 and the rear wall of the tub 1, and the main shaft 31 is rotatably connected to the drum 2 via the drum support 201 and rotatably supported at the rear wall of the tub 1. That is, the main shaft 31 may directly drive the drum 2 to rotate, and at the same time, the agitator 4 may be rotated by the planetary gear assembly 6, and the planetary gear assembly 6 is not easily damaged.

In one embodiment, the drum 2 includes a drum body 21 with two open axial ends and a rear cover 22 of the drum provided at a rear end of the drum body 21. An outer periphery of the rear cover 22 of the drum is formed as a folded edge extending in an axial direction of the drum body 21. The rear end of the drum body 21 is connected to the folded edge of the rear cover 22 of the drum. A drum support 201 is fixed at the joint of the drum body 21 and the folded edge of the rear cover 22 of the drum by a connecting member (for example, a screw), fixing the drum 2 onto the drum support 201, and the drum 2 is rotatable with the drum support 201 relative to the tub 1.

In some examples, the drum support 201 has a central shaft portion 2011 and a support portion 2012, and the central shaft portion 2011 extends in the axial direction of the tub 1 and is rotatably supported on the rear wall of the tub 1, the support portion 2012 is connected to the side peripheral wall of the central shaft portion 2011, and the drum 2 is mounted to the support portion 2012.

In one embodiment, the support portion 2012 of the drum support 201 includes a plurality of (for example, three) connecting arms distributed in the circumferential direction of the drum 2, each of the connecting arms extends in the radial direction of the drum 2, and an inner end of each of the connecting arms is connected to the side peripheral wall of the central shaft portion 2011, and an outer end of each of the connecting arms is connected to the drum 2 through a connecting member. The drum 2 is connected by using the plurality of connecting arms, which not only guarantees the reliability and stability of connection between the drum support 201 and the drum 2, but also reduces a material utilization amount of the drum support 201 and lowers material costs and weight, improving the cost performance of the drum washing machine 100. It is understood that the support portion 2012 and the central shaft portion 2011 may be integrally formed.

In some examples, the rear wall of the tub 1 is provided with a mounting hole 11, the mounting hole 11 is provided therein with a main shaft bearing seat 12, and the main shaft 31 is rotatably supported by the main shaft bearing 314 provided in the main shaft bearing seat 12. That is, the main shaft bearing seat 12 and the main shaft bearing 314 mounted in the main shaft bearing seat 12 are provided in the mounting hole 11, the main shaft 31 extends into the mounting hole 11 in the axial direction of the mounting hole 11 and is mounted to the rear wall of the tub 1 by the main shaft bearing 314, and thus, the main shaft 31 is rotatable relative to the tub 1.

Figure 4:
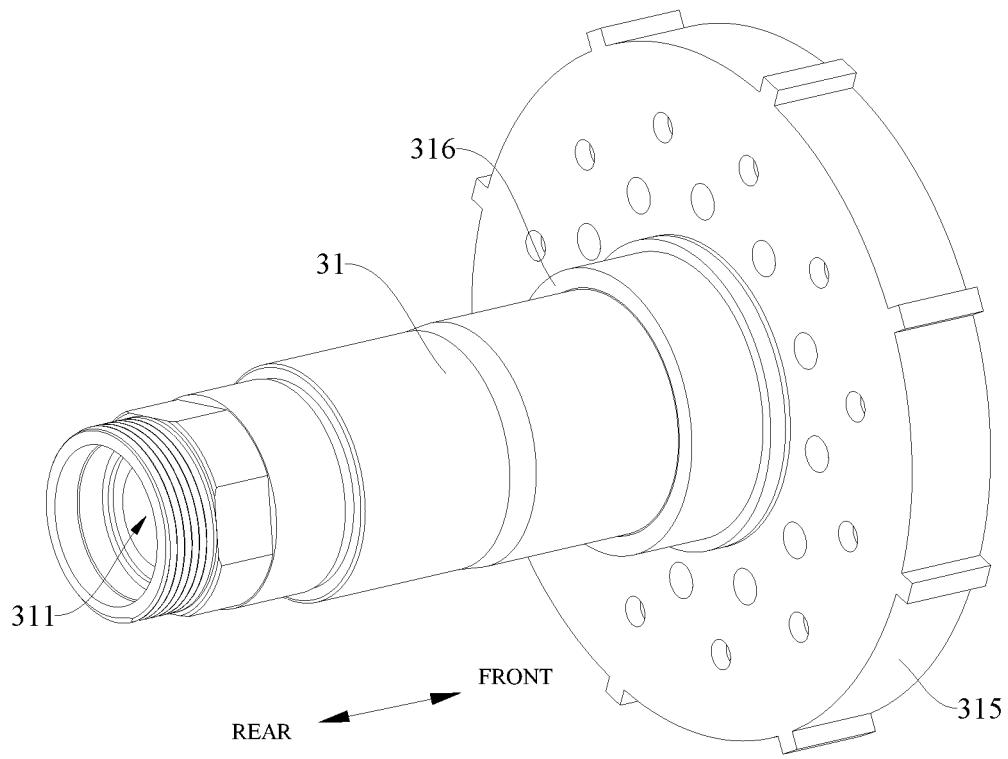
FIG. 4 is an assembly view of the main shaft, a main shaft sleeve and a main shaft flange of the drum washing machine.
Figure 5:
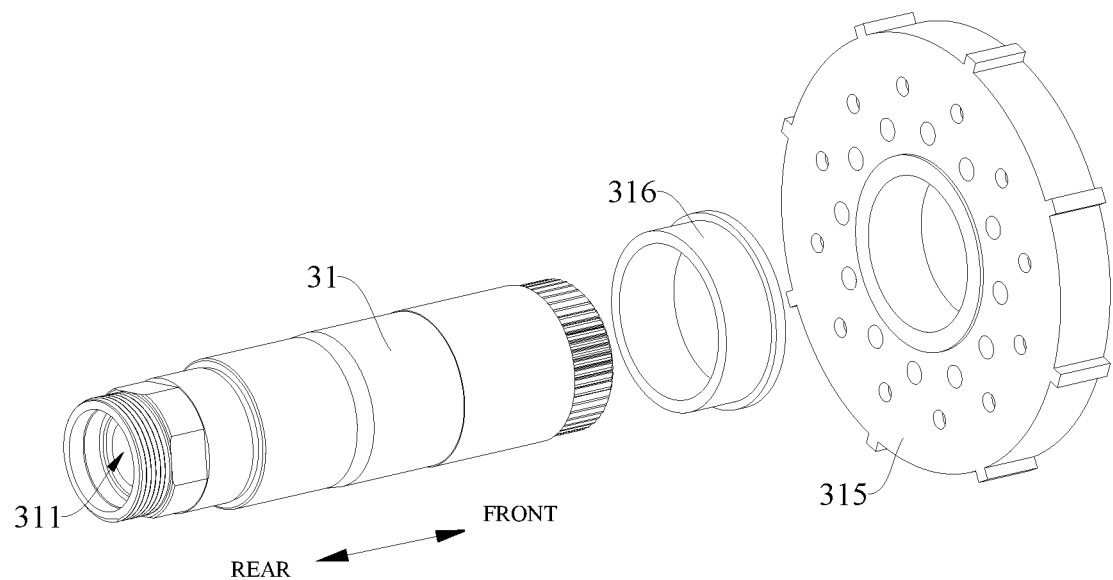
FIG. 5 is an exploded view of the structure shown in FIG. 4.
Figure 6:
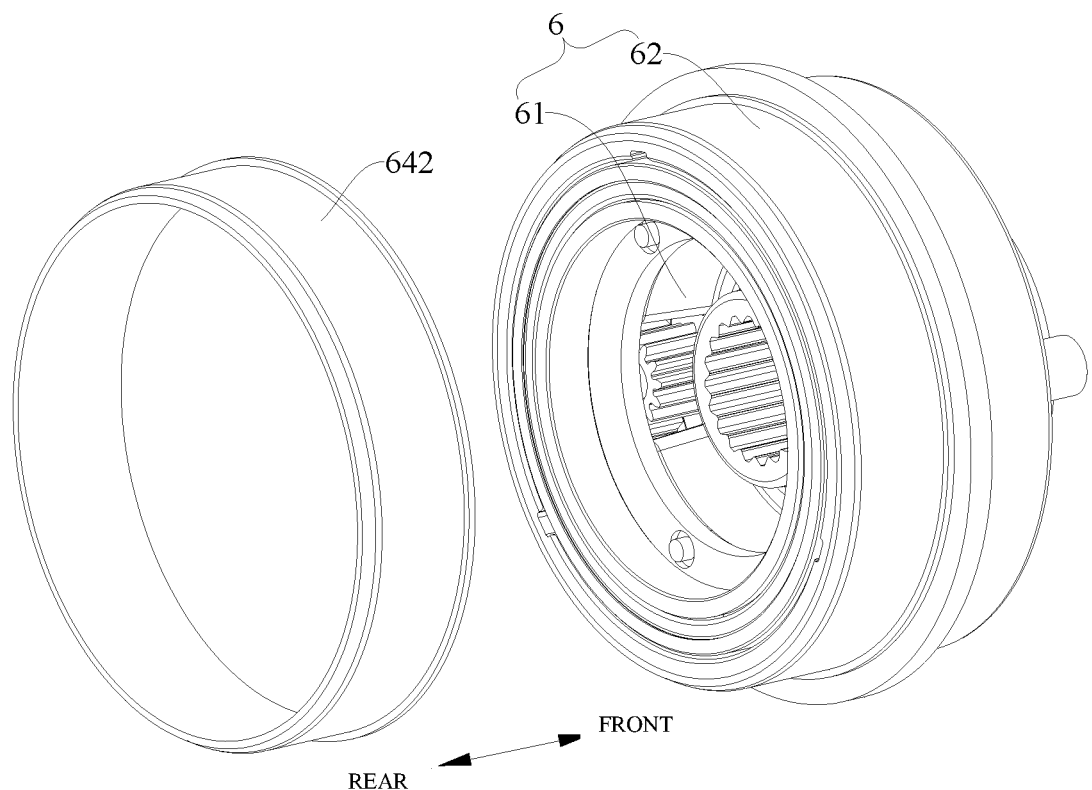
FIG. 6 is a schematic structural diagram of a planetary gear assembly and a wear sleeve of the drum washing machine.

Referring to FIGS. 4 and 5, and in conjunction with FIGS. 1, 21 and 23, in some examples, a main shaft sleeve 316 is fitted over the main shaft 31, a main shaft flange 315 is fitted over the main shaft sleeve 316, and the drum support 201 is connected to the main shaft flange 315, with convenient and reliable connection.

In one embodiment, the main shaft sleeve 316 is fitted over the main shaft 31, the main shaft flange 315 is fitted over the main shaft sleeve 316, and the drum support 201 is cast on the main shaft flange 315. For example, the drum support 201 may be a cast aluminum part. The main shaft 31, the main shaft sleeve 316 and the main shaft flange 315 may be integrally formed by machine work, which is advantageous for improving the production efficiency of the drum washing machine 100.

In some examples, an assembly seal 641 is fitted over the planetary gear assembly 6 to seal a gap between the planetary gear assembly 6 and the main shaft flange 315, guaranteeing the sealed connection between the planetary gear assembly 6 and the main shaft flange 315.

Furthermore, the outer peripheral wall of the planetary gear assembly 6 is provided with an annular limiting ring, a wear sleeve 642 is fitted over the planetary gear assembly 6 and one end is abutted against the annular limiting ring, the wear sleeve 642 is located between the planetary gear assembly 6 and the assembly seal 641, the assembly seal 641 is formed in a ring shape and fitted over the wear sleeve 642, an inner surface of the assembly seal 641 is hermetically connected to the wear sleeve 642, and an outer surface of the assembly seal 641 is hermetically connected to the main shaft flange 315 and the drum support 201 respectively. By providing the wear sleeve 642 between the assembly seal 641 and the planetary gear assembly 6, the wear sleeve 642 is engaged with the assembly seal 641 to guarantee dimensional accuracy and improve wear resistance.

Figure 12:
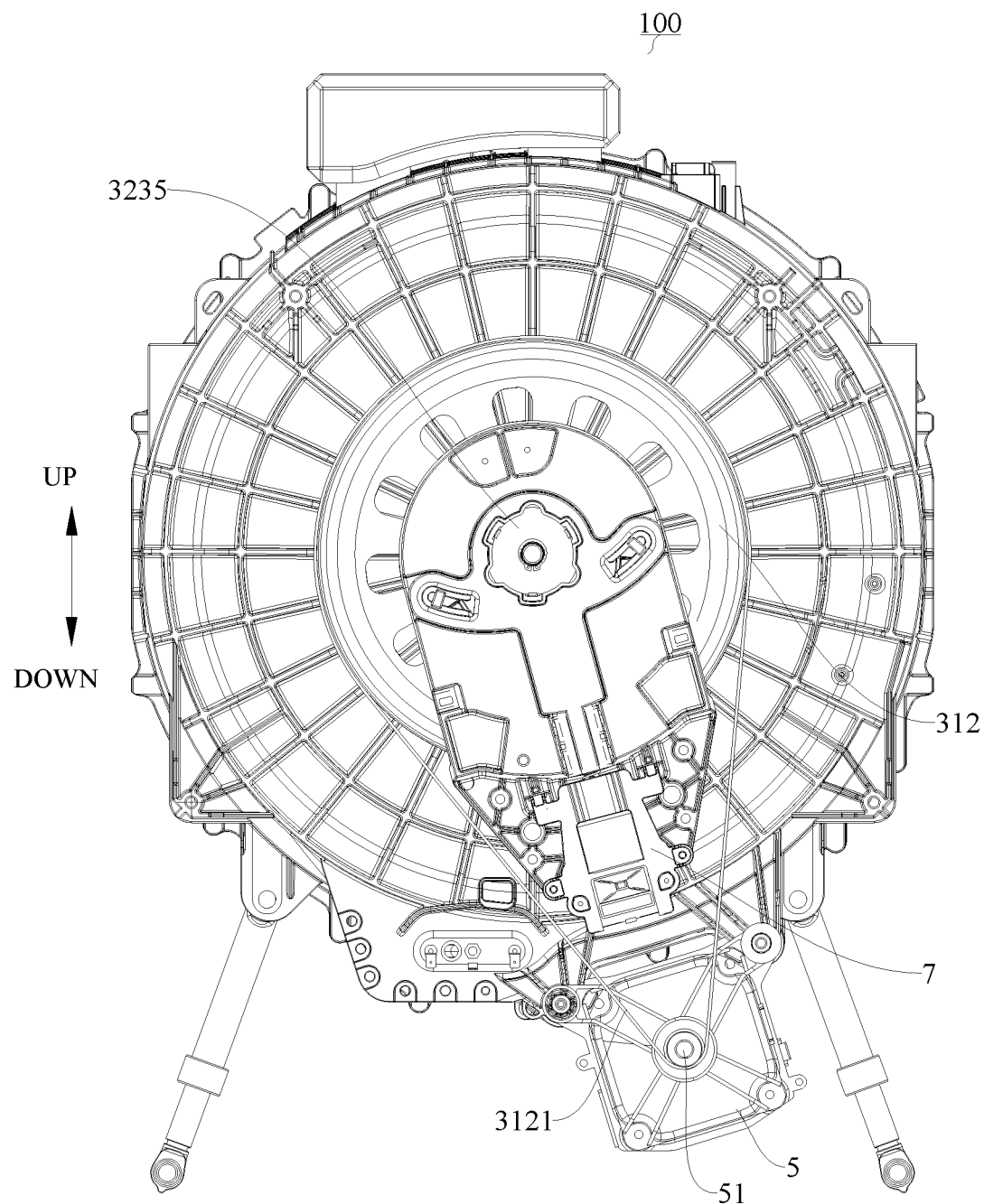
FIG. 12 is a rear view of a local structure of the drum washing machine according to an embodiment of the present disclosure.

As shown in FIG. 12, according to an embodiment of the present disclosure, the main shaft 31 is in transmission connection with a pulley 312, the driver is configured as an electric motor 5, and the electric motor 5 drives the pulley 312 to rotate by a belt 3121 tensioned on the pulley 312, i.e., the belt 3121 is wound on the electric motor shaft 51 and the pulley 312. Thus, by providing the pulley 312 and the belt 3121 on the main shaft 31, the transmission connection between the main shaft 31 and the driver is realized by the belt 3121, which cushions impact and attenuates vibration load, smooths the operation of the main shaft 31, and reduces the noise generated during operation.

In some examples, the pulley 312, the belt 3112 and the driver are all located outside the tub 1, and the pulley 312 is stopped between the rear wall of the tub 1 and a lock nut 313 on the main shaft 31. That is, the pulley 312 is fixedly connected to the main shaft 31 and located between the rear wall of the tub 1 and the lock nut 313. By providing the lock nut 313, the pulley 312 may be positioned and mounted, and the driver drives the pulley 312 to rotate through the belt 3121, and the pulley 312 drives the main shaft 31 to rotate, achieving synchronous rotation of the pulley 312 with the main shaft 31.

Figure 22:
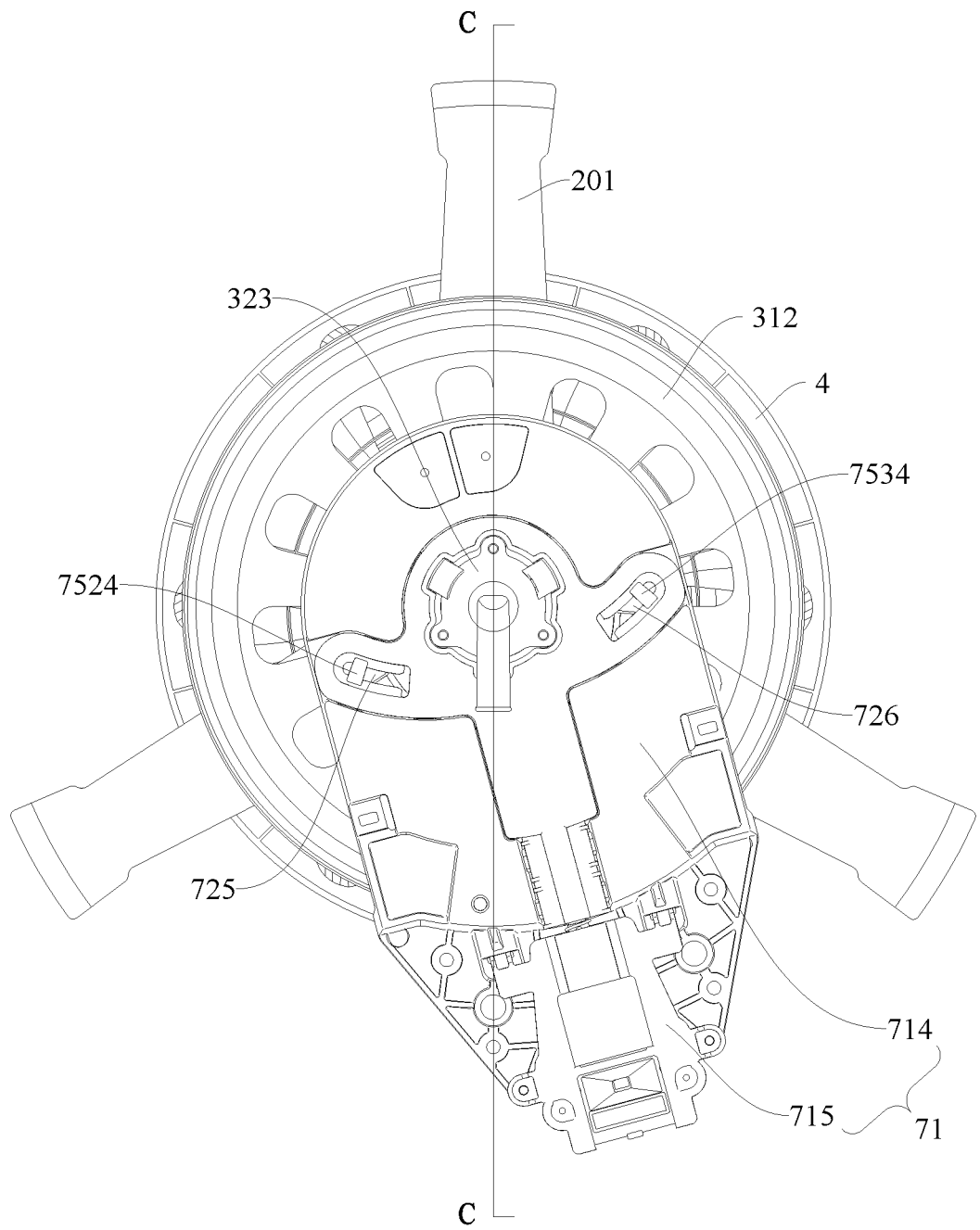
FIG. 22 is a schematic structural diagram of the drum washing machine viewed from back to front, with the casing, tub and drum removed.

As shown in FIGS. 22 and 23, according to still another embodiment of the present disclosure, the agitator 4 has a water spray hole 41, and the drum washing machine 100 further includes a water supply device (not shown), the water supply device is in communication with the tub 1 and the agitator 4 respectively, and the water supply device supplies the water in the tub 1 to the agitator 4 and sprays into the drum 2 through the water spray hole 41.

In the process of washing the laundry, the water supply device supplies water to the agitator 4, and the water spray hole 41 sprays water to the laundry in the drum 2, wetting the laundry and improving the laundry wetting effect. At the same time, the agitator 4 may agitate the water in the drum 2, which diversifies the washing mode, improving the laundry washing effect and facilitating the reduction of the washing time.

In some embodiments, the water supply device includes a water supply pipe and a water supply pump, and the water supply pipe has a first end and a second end, the first end of the water supply pipe is in communication with the tub 1, and the second end of the water supply pipe is connected to the agitator 4, supplying the water in the tub 1 to the agitator 4 through the water supply pipe. Herein, the "connected" in the "the second end of the water supply pipe is connected to the agitator 4" should be understood broadly. For example, the water supply pipe may or may not be physically connected to the agitator 4, as long as the water from the second end of the water supply pipe may be supplied to the agitator 4.

Thus, the water in an inner cavity of the tub 1 is supplied to the agitator 4 through the water supply pipe, and the laundry may be wetted, and the laundry wetting effect is improved. By communicating the water supply device with the inner cavity of the tub 1, the laundry may be wetted by the washing water in the tub 1, without an additional water source, reducing the water consumption. It is understood that in some models without a circulating pump, the first end of the water supply pipe may also be directly connected to the water supply source for water supply, such as an external faucet, instead of using circulating water in the washing machine.

In some specific examples, the first end of the water supply pipe is in communication with the bottom of the inner cavity of the tub 1. In this way, the water supply pump may pump the water at the bottom of the inner cavity of the tub 1 to the agitator 4, and even if the drum washing machine 100 is in the washing mode with the lowest water level, the water supply device may still ensure the water supply to the agitator 4, guaranteeing the wetting and washing effects of the drum washing machine 100 in different washing modes.

In some examples, the agitator 4 has a water collection cavity 42 and a water dividing passage 43 inside, and the water collection cavity 42 is in communication with the water supply device, and the water spray hole 41 is in communication with the water collection cavity 42 through the water dividing passage 43. By providing the water collection cavity 42 and the water dividing passage 43 in the agitator 4, the water supply device may transport the water to the water collection cavity 42 and the water dividing passage 43, and finally water is sprayed from the water spray hole 41 into the drum 2, wetting the laundry, and improving the laundry wetting effect and the washing effect.

In some examples, the surface of the agitator 4 facing the interior of the drum 2 is provided with a plurality of ribs 44, each of the ribs 44 extends in the radial direction of the agitator 4 and the plurality of ribs 44 are spaced apart from each other in the circumferential direction of the agitator 4. The water spray hole 41 is defined on the rib 44. When the laundry is washed, the water spray hole 41 sprays water toward the inner cavity of the drum 2, and the rib 44 enables the water in the drum 2 to generate a vortex to drive the laundry to rotate and turn over, improving the laundry washing effect.

In some specific examples, the agitator 4 is configured as an impeller. That is, the impeller is provided at the bottom of the drum 2 of the drum washing machine 100. In the process of washing the laundry, the laundry in the drum 2 is lifted up and dropped continuously, and thus may be washed clean. Simultaneously, under the action of the impeller, the drum washing machine 100 according to the present application is provided additionally with the impeller to rub the laundry based on the conventional method of dropping and washing the laundry (only the drum is rotated), further improving the washing effect and shortening the washing time.

As shown in FIGS. 1 and 23, in some other embodiments, the second shaft 32 has a water supply passage 320 inside, and the water supply device supplies water in the tub 1 to the agitator 4 through the water supply passage 320. By providing the water supply passage 320 in the second shaft 32, the second shaft 32 has a function of transporting water, transporting the washing water in the tub 1 into the water supply passage 320 of the second shaft 32 through the water supply device, and finally spraying water from the water spray hole 41 into the tub 1.

In some examples, an end of the second shaft 32 extending out of the tub 1 is provided with an adapter 323, and the water supply device is connected to the second shaft 32 via the adapter 323. By providing the adapter 323 at one end of the second shaft 32 extending out of the tub 1, a water supply end of the water supply passage 320 is sealed, and the water supply device transports the water in the tub 1 into the water supply passage 320.

In some specific examples, the adapter 323 is fitted over one end of the second shaft 32 extending out of the tub 1, an adapter bearing 3231 is provided between the adapter 323 and the second shaft 32, an inner race of the adapter bearing 3231 is fixedly connected to the second shaft 32, the outer race of the adapter bearing 3231 is fixedly connected to the adapter 323, and the adapter bearing 3231 may be configured as two ball bearings arranged side by side, or a roller bearing. Thus, the rotatable connection between the second shaft 32 and the adapter 323 is realized by the adapter bearing 3231.

Figure 19:
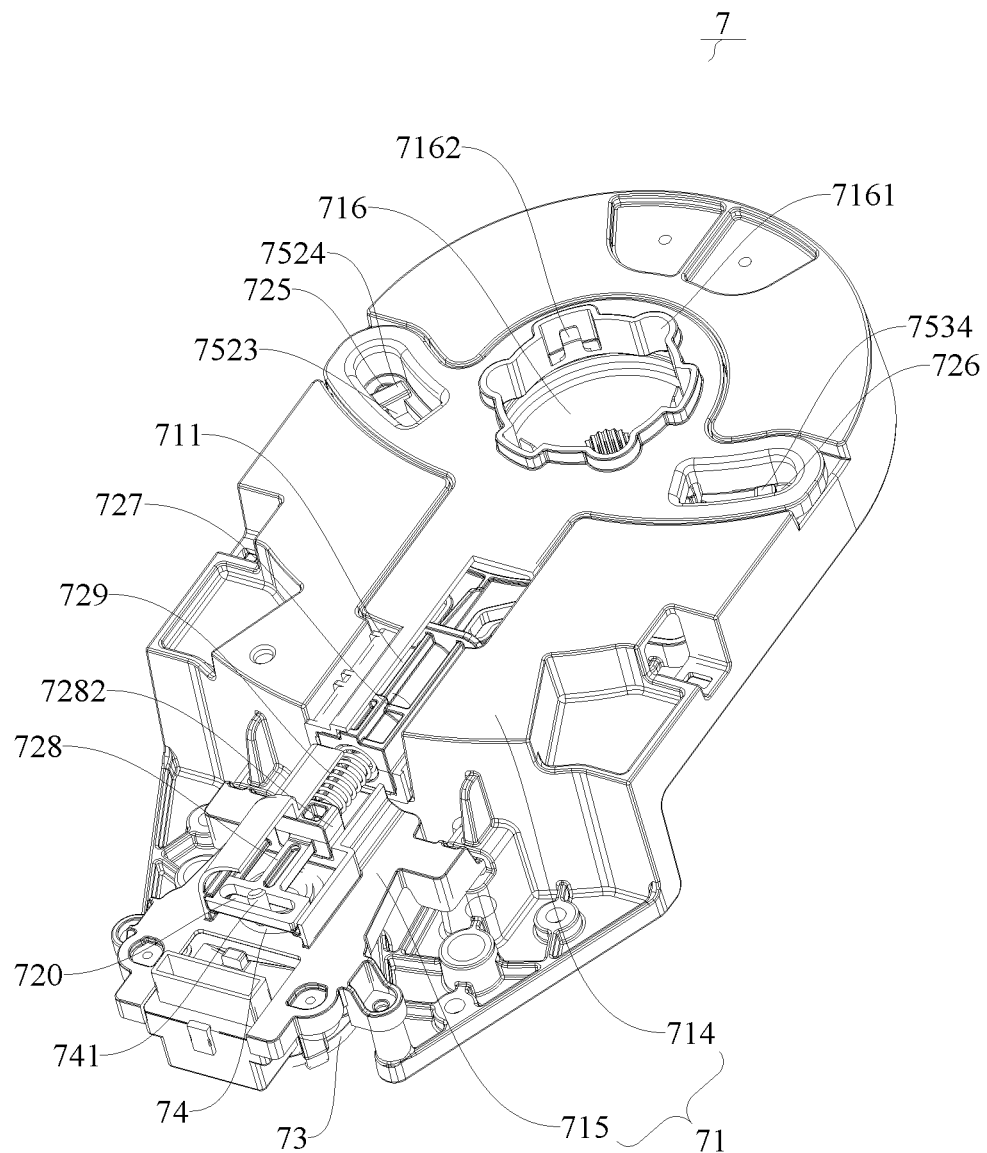
FIG. 19 is a perspective view of the brake of a drum washing machine according to an embodiment of the present disclosure.

In some embodiments of the present disclosure, as shown in FIGS. 19 and 21, a main housing 714 of the brake seat 71 is provided with an avoidance hole 716, the second shaft 32 passes through the avoidance hole 716, and the adapter 323 is fitted with the avoidance hole 716 and located outside the brake disk 322, and the adapter 323 may be mounted and positioned using the avoidance hole 716 of the brake seat 71.

In one embodiment, the inner peripheral surface of the avoidance hole 716 is provided with an anti-rotation groove 7161, the outer peripheral surface of the adapter 323 is provided with an anti-rotation protrusion 3232, and the anti-rotation protrusion 3232 is fitted with the anti-rotation groove 7161, to limit the adapter 323 in the circumferential direction of the adapter 323 and to prevent the adapter 323 from rotating in the avoidance hole 716.

Furthermore, in order to further improve the circumferential limiting effect on the adapter 323, a plurality of anti-rotation grooves 7161 is are spaced apart from each other, e.g., at equal intervals, in the circumferential direction of the avoidance hole 716. A plurality of anti-rotation protrusions 3232 are spaced apart from each other, e.g., at equal intervals, in the circumferential direction of the adapter 323. The plurality of anti-rotation protrusions 3232 are fitted with the plurality of anti-rotation grooves 7161 in one-to-one correspondence.

In some specific examples of the present disclosure, as shown in FIGS. 19, 21, and 23, the main housing 714 of the brake seat 71 is provided with an axial hook 7162 extending outwards in the axial direction of the brake seat 71, the adapter 323 is provided with an axial jaw 3233, and the axial hook 7162 is hooked to the axial jaw 3233. Thus, the adapter 323 may be positioned in the axial direction of the adapter 323 to prevent the adapter 323 from coming off the second shaft 32.

Furthermore, in order to further improve the axial limiting effect on the adapter 323, a plurality of axial jaws 3233 is provided at intervals, e.g., at equal intervals, in the circumferential direction of the adapter 323. A plurality of axial hooks 7162 is provided at intervals, e.g., at equal intervals, in the circumferential direction of the avoidance hole 716. A plurality of axial hooks 7162 are hooked to the plurality of axial jaws 3233 in one-to-one correspondence. The anti-rotation protrusion 3232 and the axial jaw 3233 may be arranged alternately and spaced apart from each other in the circumferential direction of the adapter 323, and the circumferential and axial limiting forces of the adapter 323 are distributed uniformly, further improving the stability and reliability of the adapter 323.

In one embodiment, as shown in FIG. 21, the adapter 323 is provided with a shield cover 3234 for shielding the axial jaw 3233 and the axial hook 7162. The number of shield covers 3234 is the same as the number of axial jaws 3233 and the positions of the shield covers 3234 are in one-to-one correspondence to the positions of the axial jaws 3233.

In some embodiments of the present disclosure, as shown in FIGS. 21 and 23, in order to facilitate the disassembly and assembly of the adapter 323, the adapter 323 includes an adapter seat 3235 and an adapter cover 3236.

The adapter seat 3235 is fitted over an end of the second shaft 32 extending out of the tub 1 through the adapter bearing 3231. The adapter cover 3236 is detachably mounted to the adapter seat 3235 and connected to the water supply device. Each of the anti-rotation protrusions 3232 is composed of two parts, one part is formed on the adapter seat 3235 and the other part is formed on the adapter cover 3236. The axial jaw 3233 is formed on the adapter seat 3235, and the shield cover 3234 is formed on the adapter cover 3236.

In some specific examples of the present disclosure, as shown in FIG. 21, the adapter cover 3236 is fastened to the adapter seat 3235 by an adapter fastener (not shown, such as a bolt, screw, or the like). The adapter fastener may be mounted at the anti-rotation protrusion 3232, and the adapter cover 3236 and the adapter seat 3235 are provided with mounting holes for mounting the adapter fastener at the anti-rotation protrusion 3232.

Furthermore, as shown in FIG. 23, an adapter seal ring 3237 is fitted over the second shaft 32, the adapter seal ring 3237 is configured to seal the gap between the second shaft 32 and the adapter cover 3236 and the gap between the adapter cover 3236 and the adapter seat 3235. Thus, the water entering the adapter 323 is prevented from permeating to a place outside the water supply passage 320, such as the main shaft 31, improving waterproofness and ensuring performance reliability.

In some examples, a shaft seal 325 is fitted over the second shaft 32, and is provided on the second shaft 32 and located at an outer side of a second shaft end bearing 3212. That is, the shaft seal 325 is further away from the axial center of the second shaft 32 relative to the second shaft end bearing 3212, and the shaft seal 325 seals the gap between the second shaft 32 and the planetary gear casing 62, which prevents water in the water supply passage 320 of the second shaft 32 from entering the cavity 311 of the main shaft 31 and the planetary gear assembly 6 through the gap between the second shaft 32 and the planetary gear casing 62.

Some embodiments of the drum washing machine 100 according to the present disclosure will be described in detail below with reference to FIGS. 1 to 23.

As shown in FIGS. 1, 21 and 23, the drum washing machine 100 according to an embodiment of the present disclosure includes: a tub 1, a drum 2, a main shaft 31, a second shaft 32, a driver (such as an electric motor 5 described below), a planetary gear assembly 6 and a brake 7.

The tub 1 extends in a front and rear direction and has an open front end. The rear wall of the tub 1 is provided with a mounting hole 11 penetrating in a thickness direction thereof, and the mounting hole 11 is provided therein with a main shaft bearing seat 11 extending in the axial direction thereof.

The main shaft 31 extends in the front and rear direction and has a cavity 311 extending in the axial direction thereof, and the main shaft 31 penetrates through the main shaft bearing seat 11 through two spaced main shaft bearings 314.

One end (front end shown in FIG. 1) of the main shaft 31 extending out of an inner surface of the rear wall of the tub 1 is fixedly connected to the drum support 201, and one end (rear end shown in FIG. 1) of the main shaft 31 extending out of an outer surface of the rear wall of the tub 1 is connected to the lock nut 313, the pulley 312 for mounting the belt 3121 is provided between the lock nut 313 and the outer surface of the rear wall of the main shaft 31, and the pulley 312 is in transmission connection with the electric motor shaft 51 of the electric motor 5 through the belt 3121.

The drum 2 includes the drum body 21 and the rear cover 22 of the drum. The drum body 21 extends in the axial direction of the tub 1 and has two open ends. The rear cover 22 of the drum is hermetically connected at the rear end of the drum body 21, and the drum 2 is rotatably mounted in the tub 1 by the drum support 201. The drum support 201 includes a central shaft portion 2011 and a support portion 2012 connected to an outer side wall of the central shaft portion 2011. The drum 2 is supported on the support portion 2012, and the central shaft portion 2011 is rotatably supported on the rear wall of the tub 1.

The second shaft 32 penetrates through the cavity 311 of the main shaft 31 by at least two second shaft bearings 3211 spaced apart in the axial direction thereof. The two ends of the second shaft 32 extend out of the two ends of the main shaft 31 respectively, one end (front end shown in FIG. 1) of the second shaft 32 extending out of the main shaft 31 is fitted with the planetary gear assembly 6 through the second shaft end bearing 3212, and the shaft seal 325 located at an outer side of the second shaft end bearing 3212 is further provided between the planetary gear assembly 6 and the second shaft 31, guaranteeing the sealed connection between the planetary gear assembly 6 and the second shaft 31. The other end (rear end shown in FIG. 1) of the second shaft 32 extending out of the main shaft 31 is mounted with the brake disk 322.

The agitator 4 is rotatably provided at the bottom of the drum 2 and cooperates with the planetary gear assembly 6 (such as the planetary gear casing 62 described below).

The planetary gear assembly 6 of the drum washing machine 100 according to the embodiment of the present disclosure will be described in detail below.

The planetary gear assembly 6 includes the planetary gear component 61, the planetary gear casing 62, and the planetary gear bearing 63. The planetary gear casing 62 has a through hole 622, the planetary gear component 61 is provided in the planetary gear casing 62, the planetary gear bearing 63 is provided in the planetary gear casing 62 and is located on a side of the planetary gear casing 62 back on to the through hole 622, and the planetary gear bearing 63 is provided at the rear of the planetary gear casing 62.

The planetary gear component 61 includes the planet carrier 611, three planetary gears 612, and the planetary gear outer teeth casing 613. The planet carrier 611 includes the planetary gear support 6111 and the planetary gear fixing disk 6116. One side of the planetary gear support 6111 is provided with the plurality of mounting bosses 6112 and the plurality of planetary gear mounting seats 6114. The plurality of mounting bosses 6112 and the plurality of planetary gear mounting seats 6114 are arranged alternately in the circumferential direction of the planet carrier 611. Each of the planetary gear mounting seats 6114 is provided with the planetary gear fixing shaft 6115. One end of the planetary gear fixing shaft 6115 is provided in the planetary gear mounting seat 6114, and the other end is provided in the limiting hole 6118 of the planetary gear fixing disk 6116, suitable to be engaged and configured to mount the planetary gear 612; each of the mounting bosses 6112 is provided with the positioning column 6113, and the planetary gear fixing plate 6116 is provided with the positioning hole 6117 engaged with the positioning column 6113. By welding the positioning column 6113 at the positioning hole 6117, or make the positioning column 6113 close fit with the positioning hole 6117, the planetary gear fixing plate 6116 is connected to the planetary gear support 6111. The three planetary gears 612 are mounted on the planet carrier 611 and mesh with the planetary gear outer teeth casing 613 respectively.

The planetary gear outer teeth casing 613 of the planetary gear component 61 is provided with the flange 6131 protruding from the outer surface, and the inner surface of the planetary gear casing 62 is provided with the latching slot 621 engaged with the flange 6131, fixedly connecting the planetary gear outer teeth casing 613 with the planetary gear casing 62.

The planetary gear assembly 6 is rotatably fitted to the second shaft 32 via the second shaft end bearing 3212. The planetary gear assembly 6 is rotatably fitted to the main shaft 31 via the planetary gear bearing 63. In one embodiment, the main shaft sleeve 316 is fitted over the main shaft 31, the main shaft sleeve 316 is provided with the main shaft flange 315 connected to the drum support 201, the wear sleeve 642 is fitted over the planetary gear assembly 6, the wear sleeve 624 is provided with the assembly seal 641, and the sealed connections between the planetary gear assembly 6 and the drum support 201 as well as the planetary gear assembly 6 and the main shaft flange 315 are realized by the assembly seal 641.

The brake 7 of the drum washing machine 100 according to an embodiment of the present disclosure will be described in detail below.

The brake 7 is provided at the rear of the tub 1 and includes the brake disk 322, the brake seat 71, the brake pawl 75, the brake lever 72, the brake driver 73, and the brake cam 74.

The brake seat 71 is mounted on the rear wall of the tub 1, and the brake lever 72 is slidably fitted with the slideway 711 between the extending position and the retracting position. The brake lever 72 includes the shifter lever 727, the transmission bar 728, and the brake compression spring 729 compressed between the shifter lever 727 and the transmission bar 728.

The brake lever 72 at the extending position acts on the brake pawl 75 and switches the brake pawl 75 to the tightening state to hold tightly the brake disk 322. The brake lever 72 at the retracting position acts on the brake pawl 75 and switches the brake pawl 75 to the releasing state to release the brake disk 322.

The brake cam 74 is mounted to the brake seat 71 and has the eccentric column 741, and the brake driver 73 is configured to drive the brake cam 74 to rotate, rotating the eccentric column 741 eccentrically. The eccentric column 741 is engaged with the straight sliding groove 720 on the transmission bar 728, and then drives the brake lever 72 to move linearly.

According to another embodiment of the present disclosure, an end of the second shaft 32 extending out of the rear wall of the tub 1 is provided with the adapter 323 for connecting the water supply device, the adapter seat 3235 of the adapter 323 is fitted over the second shaft 32 through the adapter bearing 3231, the adapter seal ring 3237 is fitted over the second shaft 32, and the adapter seal ring 3237 is located at the outer side of the adapter bearing 3231.

Furthermore, the second shaft 32 has the water supply passage 320 inside extending in the axial direction thereof, one end of the water supply passage 320 is in communication with the adapter 323, and the other end of the water supply passage 320 is in communication with the agitator 4. The agitator 4 has the water collection cavity 42 to be in communication with the water supply passage 320, the water dividing passage 43 defined by the rib 44, and the water spray hole 41 provided on the rib 44.

The water supply device includes the water supply pipe and the water supply pump. The first end of the water supply pipe is in communication with the tub 1, the second end of the water supply pipe is in communication with the water supply passage 320, and the water supply pump is arranged on the water supply pipe, and when the water supply pump is working, the water in the tub 1 is conveyed into the agitator 4 via the water supply pipe and the water supply passage 320.

The working process of the drum washing machine 100 according to an embodiment of the present disclosure will be described in detail below.

When the drum washing machine 100 is operating in the washing mode, the brake driver 73 drives the brake lever 72 to move to the extending position, and the brake pawl 75 is switched to the tightening state to hold tightly and lock the brake disk 322, and the second shaft 32 is fixed, and since the planet carrier 611 of the planetary gear assembly 6 is fitted with the second shaft 32 by a spline structure, the planet carrier 611 is also fixed, and only the plurality of planetary gears 612 on the planet carrier 611 are rotatable.

Subsequently, when the electric motor 5 is in operation, the pulley 312 is driven to rotate in a forward direction by the belt 3121, and the main shaft 31 and the drum 2 are driven to rotate in the forward direction. Since the main shaft 31 meshes with the plurality of planetary gears 612, the main shaft 31 may simultaneously drive the plurality of planetary gears 612 to rotate when rotating, which further drives the planetary gear outer teeth casing 613 to rotate in the opposite direction. Since the planetary gear outer teeth casing 613 is connected to the planetary gear casing 62 and the planetary gear casing 62 is connected to the agitator 4, the main shaft 31 drives the agitator to rotate in the opposite direction by the planetary gear assembly 6.

In this process, the laundry in the drum 2 is lifted up and dropped continuously, and thus may be washed clean. Simultaneously, under the action of the agitator 4, the drum washing machine 100 according to the present application is provided additionally with the impeller to rub the laundry based on the conventional method of dropping and washing the laundry (only the drum is rotated), further improving the washing effect and shortening the washing time.

When the agitator 4 has the water spray hole 41, the water supply pump may supply water to the agitator 4 through the water supply passage 320 of the second shaft 2 or through the water supply pipe, causing the water spray hole 41 to spray water to the laundry in the drum 2, which wets the laundry, improves the laundry wetting effect, and further improves the laundry washing effect.

It is understood that when the drum washing machine 100 is in the washing mode, the planetary gear assembly 6 transmits the forward rotation of the main shaft 31 as the reversed rotation of the agitator 4, and at the same time, the planetary gear assembly 6 is in transmission connection with the main shaft 31, which may reduce the speed of the main shaft 31, making the rotational speed of the agitator 4 less than the rotational speed of the main shaft 31. Here, the "forward rotation" and "reversed rotation" are relative terms and do not refer to a specific counterclockwise or clockwise rotation.

When the drum washing machine 100 is operating in the spin mode, the brake driver 73 drives the brake lever 72 to move to the retracting position, the brake pawl 75 is switched to the releasing state, and the brake disk 322 is released, and the second shaft 32 is in the free state.

Subsequently, when the electric motor 5 drives the pulley 312 to rotate in the forward direction through the belt 3121, the main shaft 31 and the drum 2 may be driven to rotate in the forward direction, and then the main shaft 31 drives the planetary gear component 61 to rotate in the same direction, driving the planetary gear casing 62, the agitator 4 and the drum 2 to rotate in the same direction and at the same speed.

In the drum washing machine 100 according to the embodiment of the present disclosure, by providing the driver, the driver drives the drum 2 via the main shaft 31, the number of levels of power transmission is less, and the power transmission is more direct, stabilizing the operation of the drum 2. The planetary gear assembly 6 is provided between the main shaft 31 and the agitator 4, and the torque of the main shaft 31 is transmitted to the agitator 4 by the planetary gear assembly 6. Since the load of the agitator 4 is much less than the load of the drum 2, compared with the drum washing machine with an impeller in the related art, the load acting on the planetary gear assembly 6 is greatly reduced, which greatly reduces the risk of damage to the planetary gear assembly 6 to prolong the service life of the drum washing machine 100.

Other components and operations of the drum washing machine 100 according to the embodiments of the present disclosure and will not be described in detail herein.

In the description of the present specification, reference throughout this specification to "an embodiment", "some embodiments", "exemplary embodiment", "example", "specific example" or "some examples" means that a particular feature, structure, material, or characteristic described in connection with the embodiment or example is included in at least one embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples.

What is claimed is:

1. A brake for a drum washing machine, comprising:
   a brake disk provided on a second shaft of the drum washing machine connected to a planetary gear assembly;
   a brake seat provided with a slideway;
   a brake pawl provided to the brake seat and switchable between a tightening state of holding the brake disk and a releasing state of releasing the brake disk;
   a brake lever slidably fitted with the slideway between an extending position and a retracting position and linked with the brake pawl, wherein the brake pawl is switched to a tightening state when the brake lever is located at the extending position, and the brake pawl is switched to a releasing state when the brake lever is located at the retracting position;
   a brake driver mounted to the brake seat, in transmission connection with the brake lever, and driving the brake lever to move between the extending position and the retracting position; and a brake cam, wherein the brake driver is configured as an electric motor and in transmission connection with the brake lever via the brake cam, the brake cam converting a rotational motion of an electric motor shaft of the electric motor into a linear motion of the brake lever in the slideway.

2. The brake for a drum washing machine according to claim 1, wherein an outer peripheral surface of the brake disk is provided with gear teeth, and an inner side surface of the brake pawl is provided with pawl teeth, when the brake pawl is in the tightening state, a pawl teeth mesh with gear teeth, and when the brake pawl is in the releasing state, pawl teeth are disengaged from the gear teeth.

3. The brake for a drum washing machine according to claim 1, wherein the brake pawl comprises:
a first pawl portion having a first end pivotally mounted to the brake seat;
a second pawl portion having a first end pivotally mounted to the brake seat, the brake disk being located between the first pawl portion and the second pawl portion,
when the brake pawl is in the tightening state, a second end of the first pawl portion and a second end of the second pawl portion are adjacent to each other, and when the brake pawl is in the releasing state, the second end of the first pawl portion and the second end of the second pawl portion are away from each other.

4. The brake for a drum washing machine according to claim 3, wherein at least a part of the first pawl portion is configured to be in a shape of an arc matching a shape of the brake disk, and at least a part of the second pawl portion is configured to be in a shape of an arc matching a shape of the brake disk.

5. The brake for a drum washing machine according to claim 3, wherein the brake seat is provided with a first rotation column and a second rotation column in the brake seat, the first pawl portion is provided with a first pivot hole pivotally fitted over the first rotation column, the second pawl portion is provided with a second pivot hole pivotally fitted over the second rotation column.

6. The brake for a drum washing machine according to claim 3, wherein the brake lever is provided with a first drive chute and a second drive chute obliquely respect to a sliding direction of the brake lever separately, the second end of the first pawl portion is provided with a first drive column slidably fitted with the first drive chute, and the second end of the second pawl portion is provided with a second drive column slidably fitted with the second drive chute.

7. The brake for a drum washing machine according to claim 6, wherein an end of the first drive chute away from the brake disk and an end of the second drive chute away from the brake disk are adjacent to each other, and an end of the first drive chute adjacent to the brake disk and an end of the second drive chute adjacent to the brake disk are away from each other.

8. The brake for a drum washing machine according to claim 6, wherein the brake lever is provided with a first limiting groove and a second limiting groove separately parallel to a sliding direction of the braking lever respectively, the first limiting groove is in communication with the first drive chute and extends from the first drive chute in a direction away from the brake disk, the second limiting groove is in communication with the second drive chute and extends from the second drive chute in a direction away from the brake disk, the first drive column slides into the first limiting groove and the second drive column slides into the second limiting groove when the brake pawl is in the tightening state.

9. The brake for a drum washing machine according to claim 3, wherein the brake seat is provided with a first guide chute and a second guide chute obliquely respect to a sliding direction of the brake lever separately, a first guide column slidably fitted with the first guide chute is provided between two ends of the first pawl portion, and a second guide column slidably fitted with the second guide chute is provided between two ends of the second pawl portion.

10. The brake for a drum washing machine according to claim 9, wherein an end portion of the first guide column is provided with a first anti-off head configured to prevent the first guide column from escaping from the first guide chute, and an end portion of the second guide column is provided with a second anti-off head configured to prevent the second guide column from escaping from the second guide chute.

11. The brake for a drum washing machine according to claim 1, wherein the brake lever comprises:
a shifter lever linked with the brake pawl;
a transmission bar in transmission connection with the brake driver and hooked to the shifter lever; and
a brake compression spring compressed between the shifter lever and the transmission bar.

12. The brake for a drum washing machine according to claim 11, wherein the shifter lever is provided with a hooking surface facing the brake disk, the transmission bar is provided with a hook, and the hook is hooked to the hooking surface.

13. The brake for a drum washing machine according to claim 11, wherein the shifter lever is provided with a mounting cavity and the mounting cavity is provided with a stop step therein, the transmission bar is provided with a slide block having a section in a shape matching a shape of a cross section of the slideway, the brake compression spring is fitted over the transmission bar, the brake compression spring and the transmission bar extend into the mounting cavity, the brake compression spring has a first end abutting against the stop step and a second end abutting against the slide block.

14. The brake for a drum washing machine according to claim 11, wherein the brake seat comprises a main housing and a support detachably mounted to the main housing, the brake pawl is mounted to the main housing and the brake driver is mounted to the support, the slideway comprises a housing section and a support section spaced apart from each other, the housing section is formed at the main housing and the support section is formed at the support, the shifter lever is slidably fitted with the housing section, and the transmission bar is slidably fitted with the support section.

15. The brake for a drum washing machine according to claim 1, wherein a cam is provided with an eccentric column, and the brake lever is provided with a straight sliding groove, and the eccentric column is slidably fitted in the straight sliding groove.

16. The brake for a drum washing machine according to claim 15, wherein a length direction of the straight sliding groove is perpendicular to a direction of the linear motion of the brake lever.

17. The brake for a drum washing machine according to claim 1, wherein the brake seat is configured to be mounted to a rear wall of a tub of the drum washing machine.

18. A drum washing machine, comprising:
a brake for a drum washing machine, comprising:

a brake disk provided on a second shaft of the drum washing machine connected to a planetary gear assembly;

a brake seat provided with a slideway;

a brake pawl provided to the brake seat and switchable between a tightening state of holding the brake disk and a releasing state of releasing the brake disk;

a brake lever slidably fitted with the slideway between an extending position and a retracting position and linked with the brake pawl, wherein the brake pawl is switched to a tightening state when the brake lever is located at the extending position, and the brake pawl is switched to a releasing state when the brake lever is located at the retracting position; and a brake driver mounted to the brake seat, in transmission connection with the brake lever, and driving the brake lever to move between the extending position and the retracting position; and a brake cam, wherein the brake driver is configured as an electric motor and in transmission connection with the brake lever via the brake cam, the brake cam converting a rotational motion of an electric motor shaft of the electric motor into a linear motion of the brake lever in the slideway.

* * * * *